(12) United States Patent
Lowry

(10) Patent No.: US 7,433,893 B2
(45) Date of Patent: Oct. 7, 2008

(54) METHOD AND SYSTEM FOR COMPRESSION INDEXING AND EFFICIENT PROXIMITY SEARCH OF TEXT DATA

(75) Inventor: Douglas B. Lowry, Steubenville, OH (US)

(73) Assignee: Marpex Inc., Steubenville, OH (US)

( * ) Notice: Subject to any disclaimer, the term of this patent is extended or adjusted under 35 U.S.C. 154(b) by 559 days.

(21) Appl. No.: 10/795,721

(22) Filed: Mar. 8, 2004

(65) Prior Publication Data

US 2005/0198070 A1  Sep. 8, 2005

(51) Int. Cl.
*G06F 17/30* (2006.01)
*G06F 17/00* (2006.01)

(52) U.S. Cl. .................................. 707/104.1; 707/3

(58) Field of Classification Search .............. 707/104.1, 707/101, 102, 5, 532, 536, 3, 2; 704/9
See application file for complete search history.

(56) References Cited

U.S. PATENT DOCUMENTS

| | | | | |
|---|---|---|---|---|
| 5,787,386 | A * | 7/1998 | Kaplan et al. | 704/8 |
| 6,081,774 | A * | 6/2000 | de Hita et al. | 704/9 |
| 6,304,601 | B1 * | 10/2001 | Davison | 375/240 |
| 6,323,858 | B1 * | 11/2001 | Gilbert et al. | 345/419 |
| 6,362,756 | B1 * | 3/2002 | Shannon | 341/87 |
| 2004/0158580 | A1 * | 8/2004 | Carmel et al. | 707/104.1 |

* cited by examiner

*Primary Examiner*—Charles Rones
*Assistant Examiner*—Fariborz Khoshnoodi
(74) *Attorney, Agent, or Firm*—Brouse McDowell; Heather M. Barnes

(57) ABSTRACT

A system and method of compression indexing and efficient proximity search of text data permits high speed search featuring ranking the relevance of search results according to closeness of desired terms within each portion of text found. The system includes (a) preparing target text, (b) creating a "compression index ebook", (c) browsing in a compression index ebook, and (d) searching in a compression index ebook. To create the compression index, the method includes the steps of selecting target text, identifying tokens, such as words and punctuation strings, wherein each of the tokens has a frequency. The frequencies of each token are counted. Tokens are ranked from highest frequency to lowest frequency. The frequencies are compressed. The next step is assigning positions to each token frequency and compressing the positions to form a compression index ebook, which is stored in random access memory to eliminate disk seeks during browsing and searching.

22 Claims, 33 Drawing Sheets

Figure 01: Efficient proximity search of text
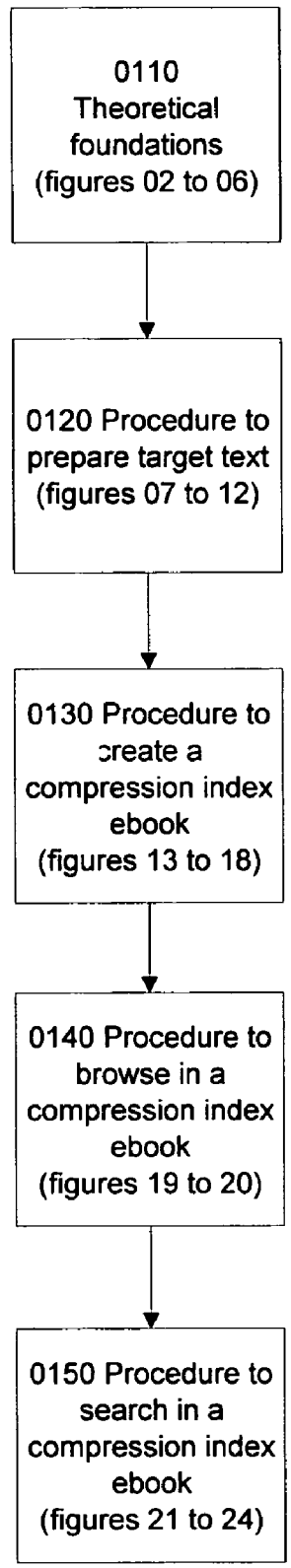

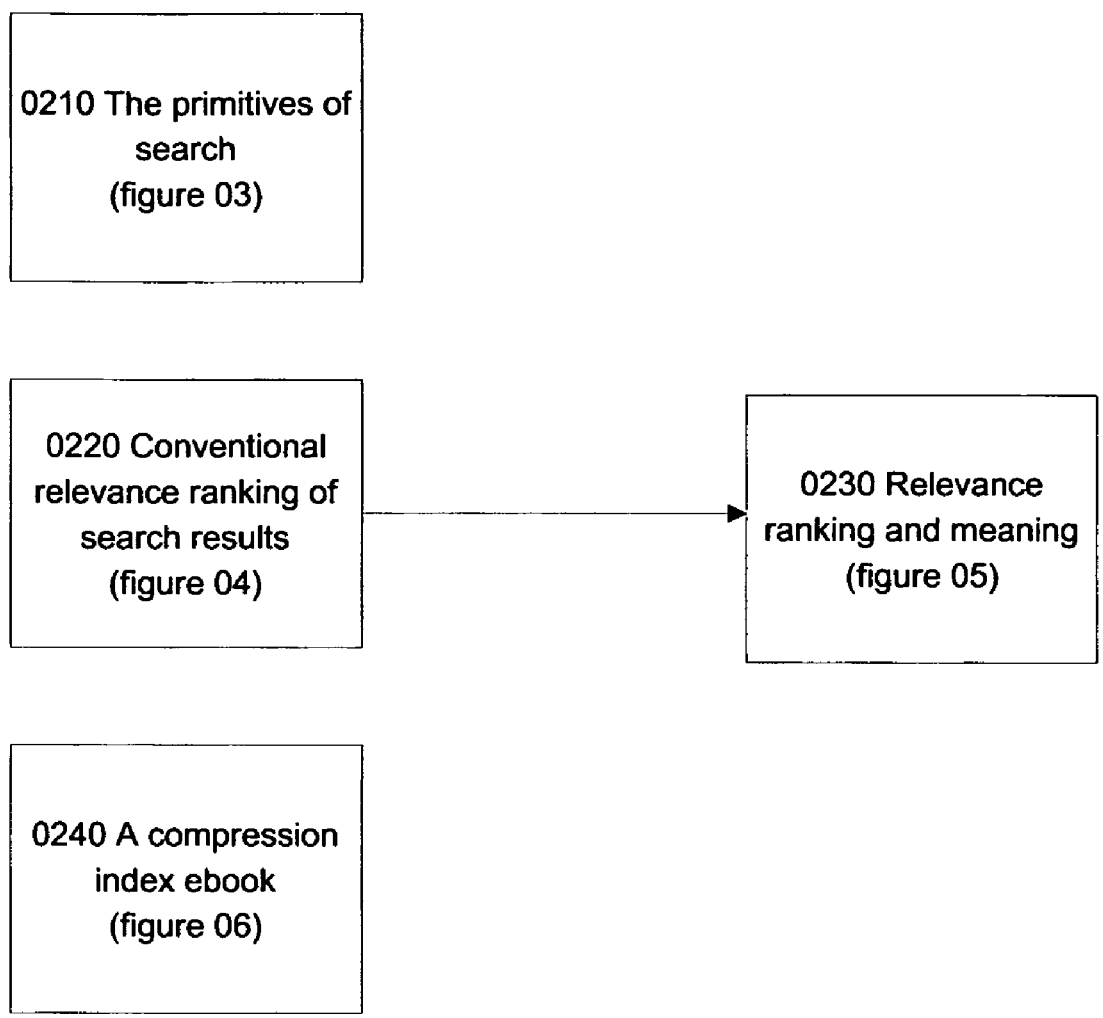
Figure 02: Theoretical foundations (0110)

Figure 03: The primitives of search (0210)

0310
Tokens

0320 Frequencies

0330
Positions

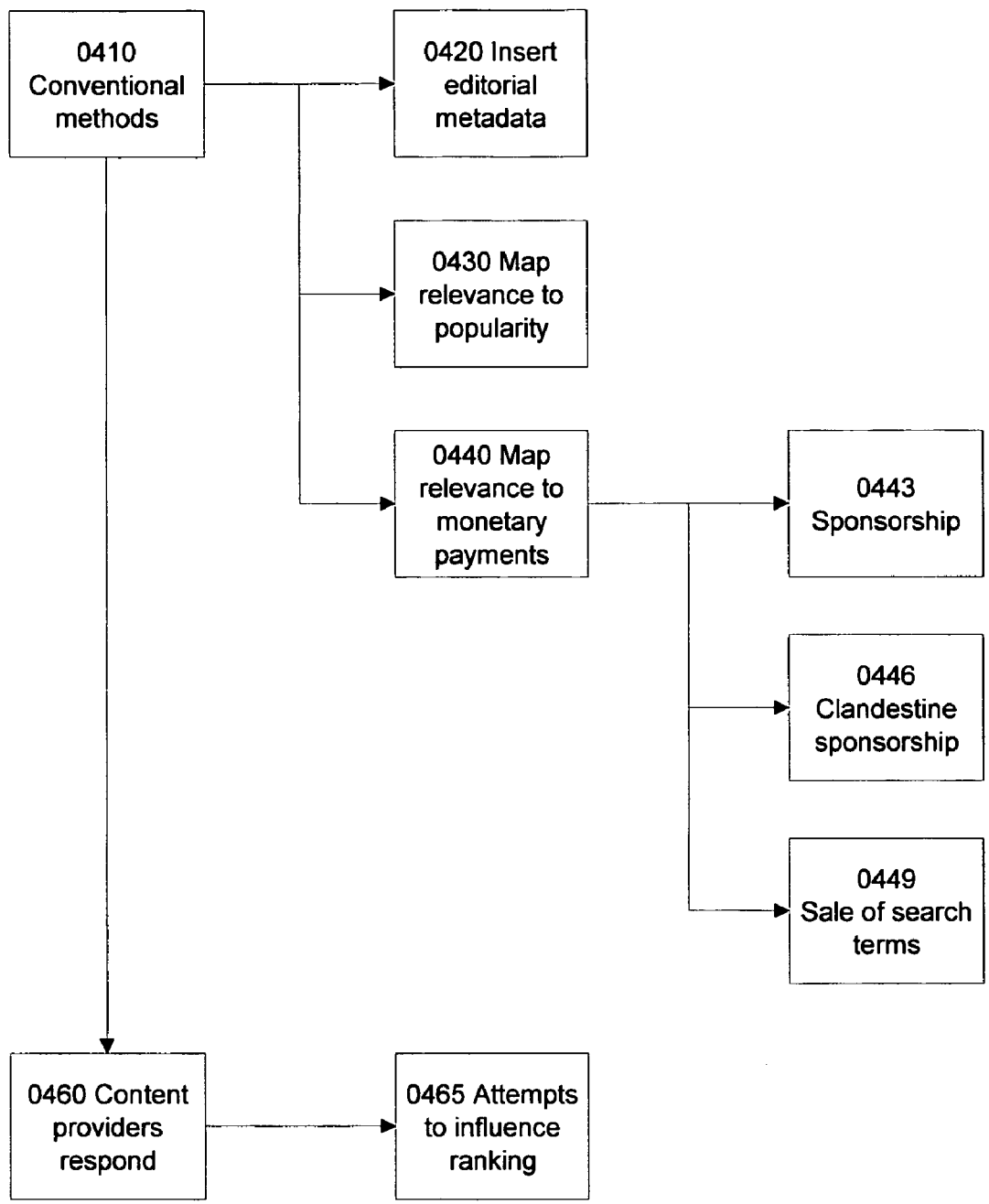
Figure 04: Conventional relevance ranking of search results (0220)

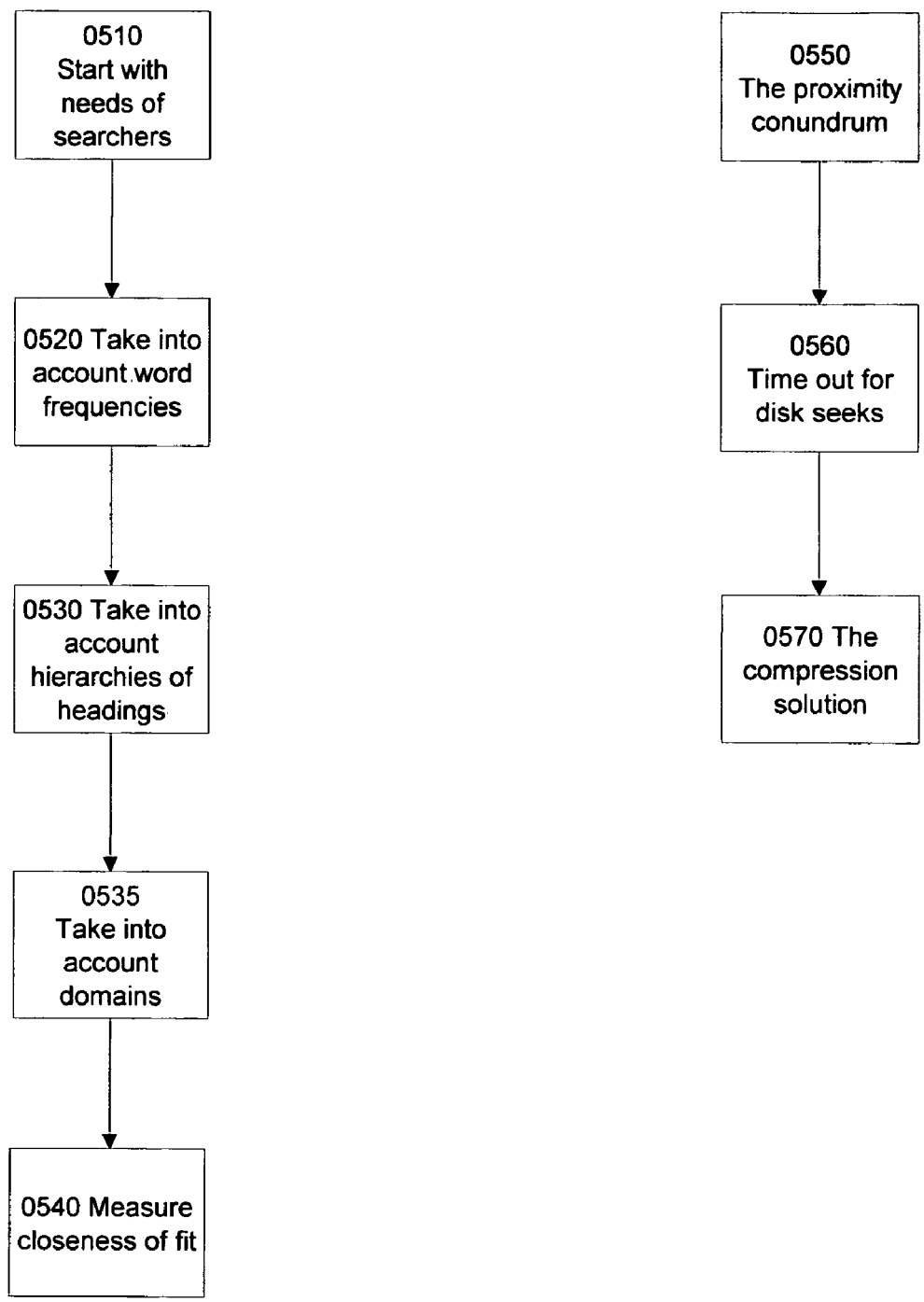
Figure 05: Relevance ranking and meaning (0230)

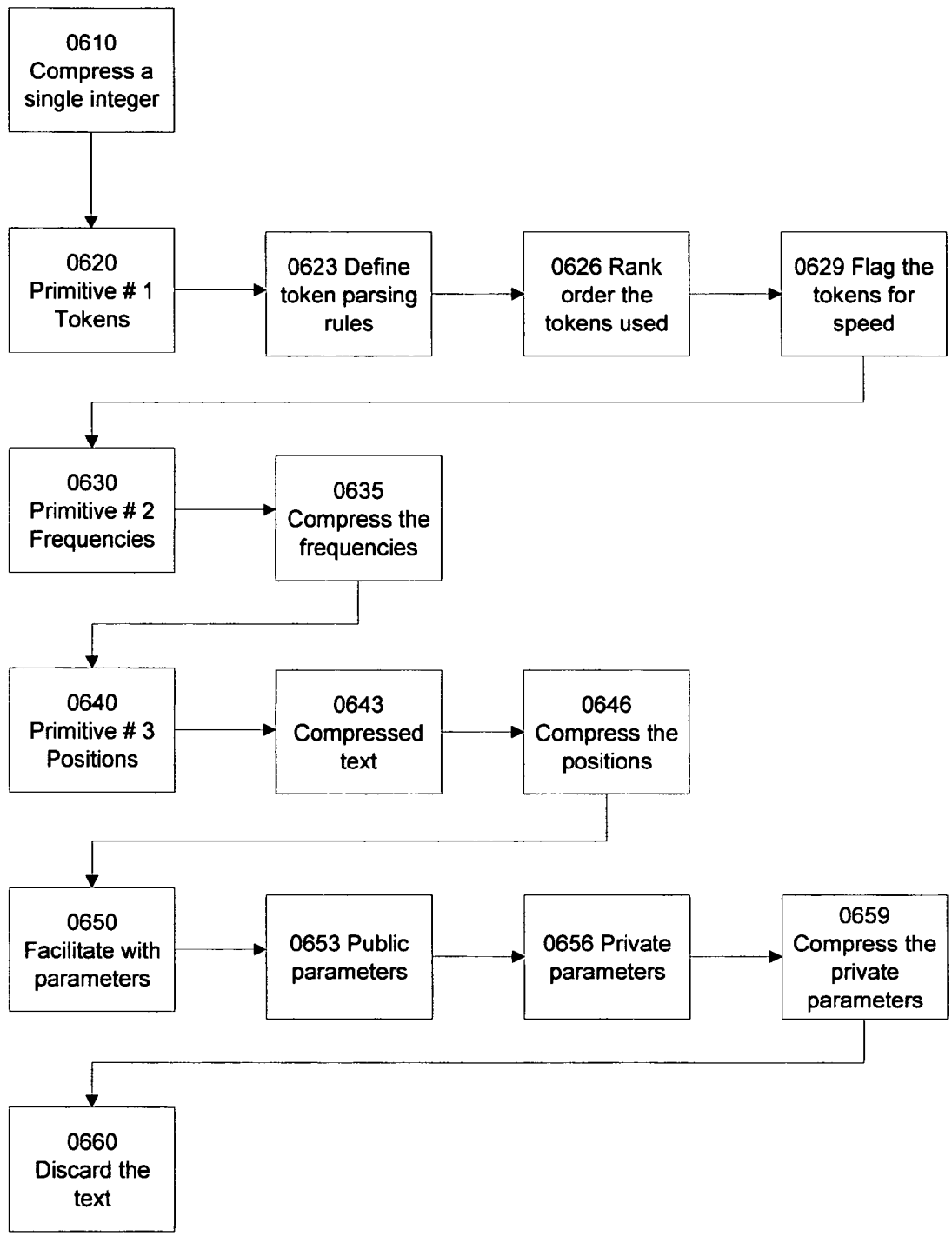
Figure 06: A compression index ebook (0240)

Figure 07: Procedure to prepare target text (0120)
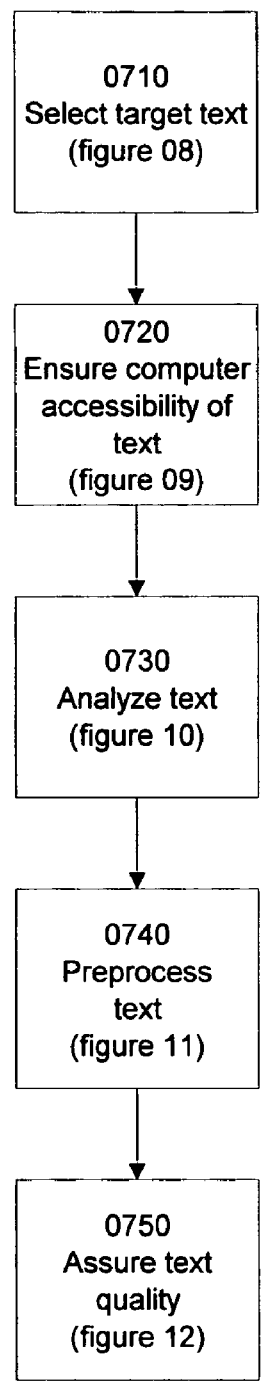

Figure 08: Select target text (0710)
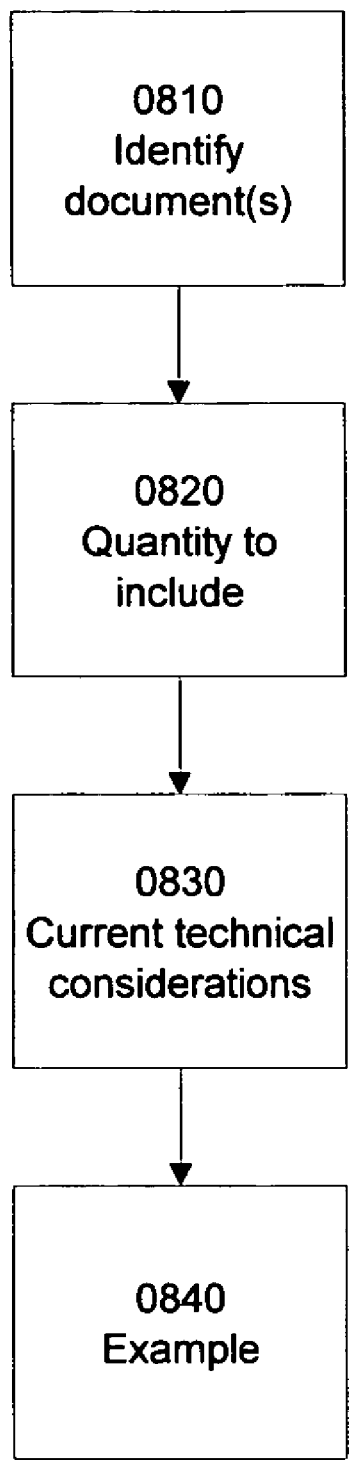

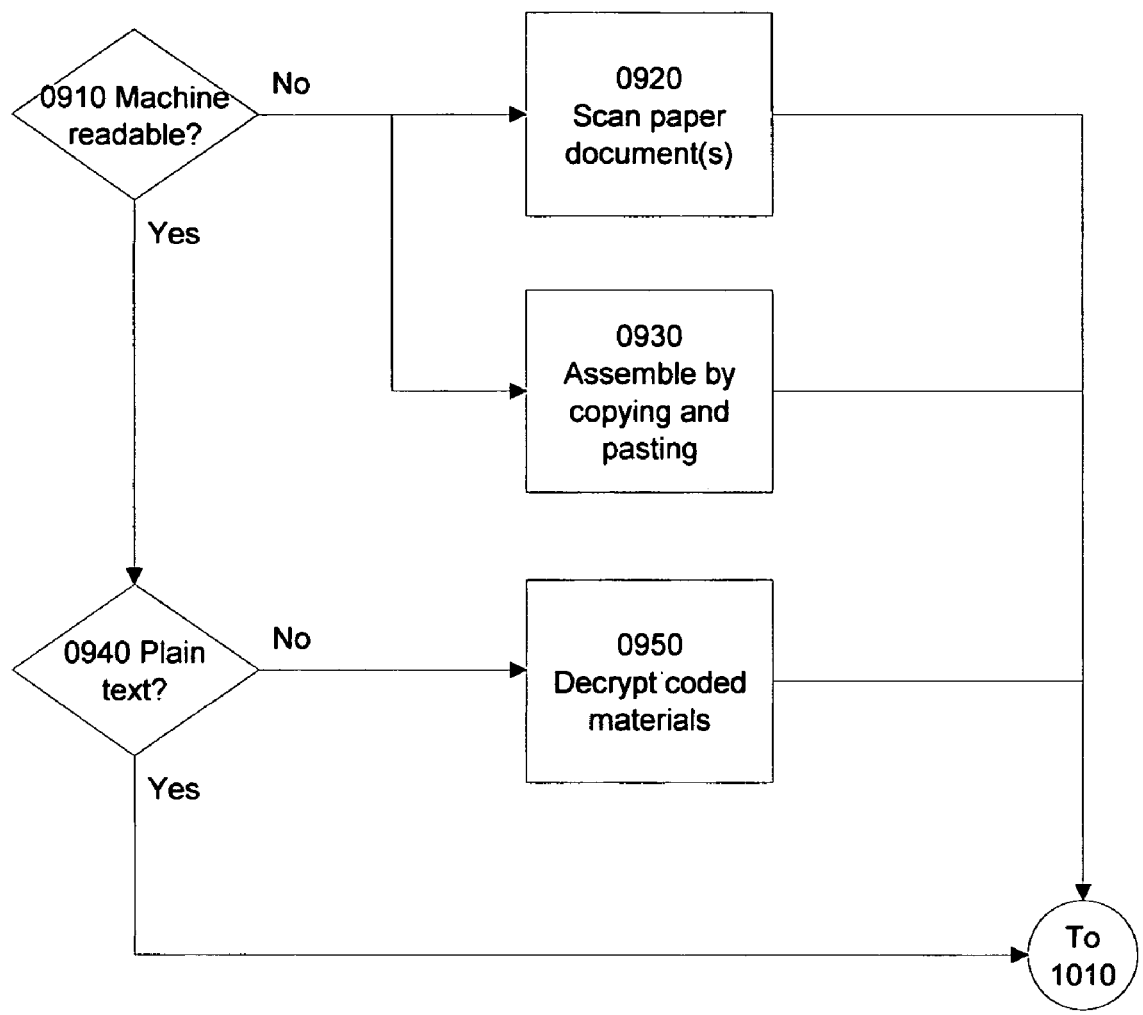
Figure 09: Ensure computer accessibility of text (0720)

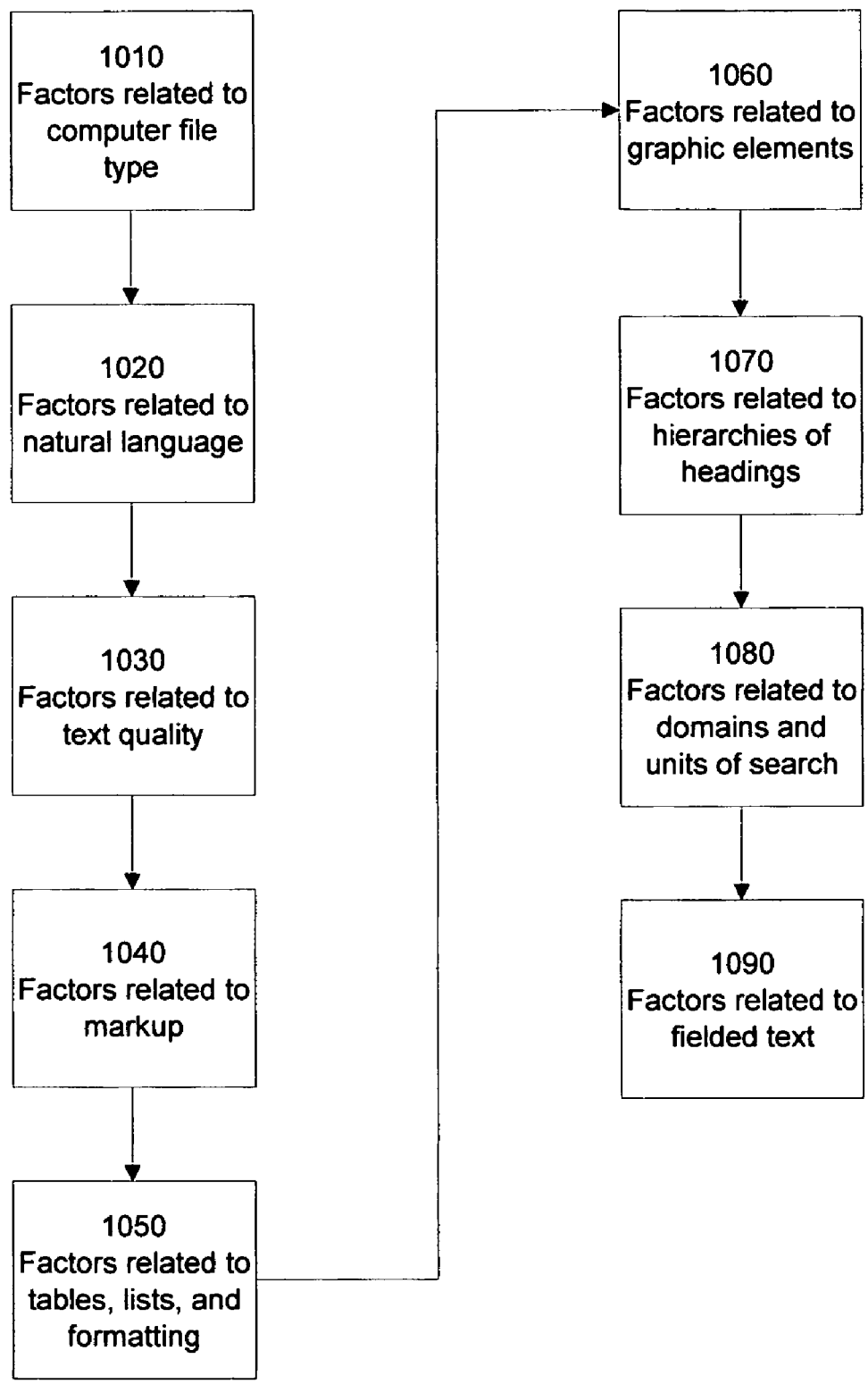
Figure 10: Analyze text (0730)

Figure 11: Preprocess text (0740)
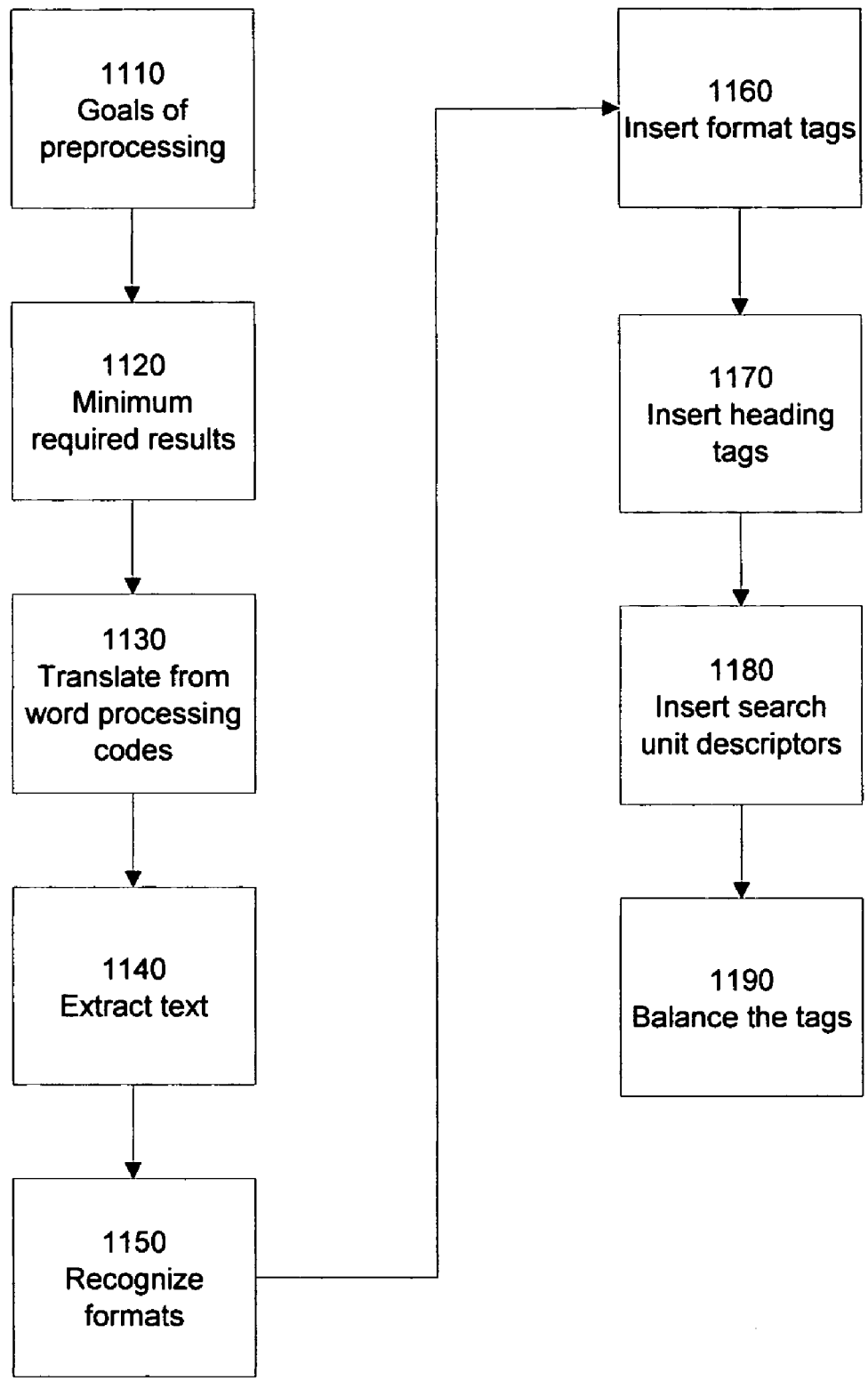

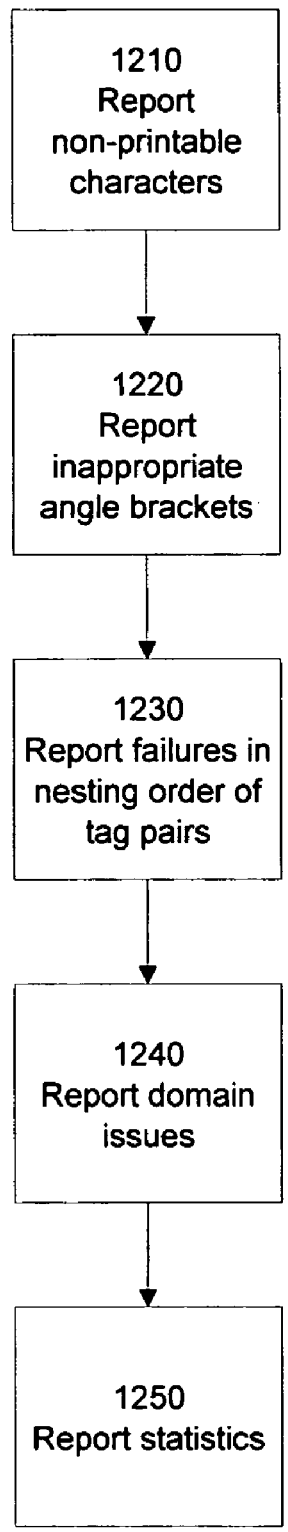
Figure 12: Assure text quality (0750)

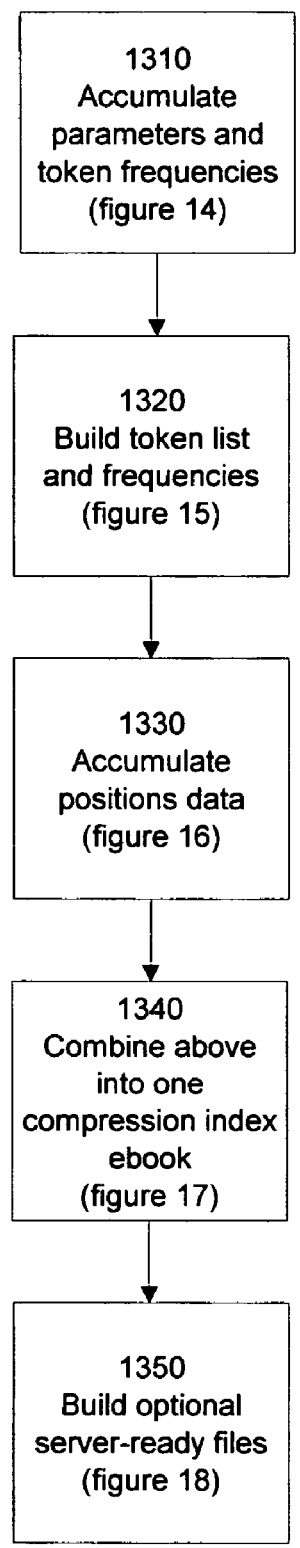
Figure 13: Procedure to create a compression index ebook (0130)

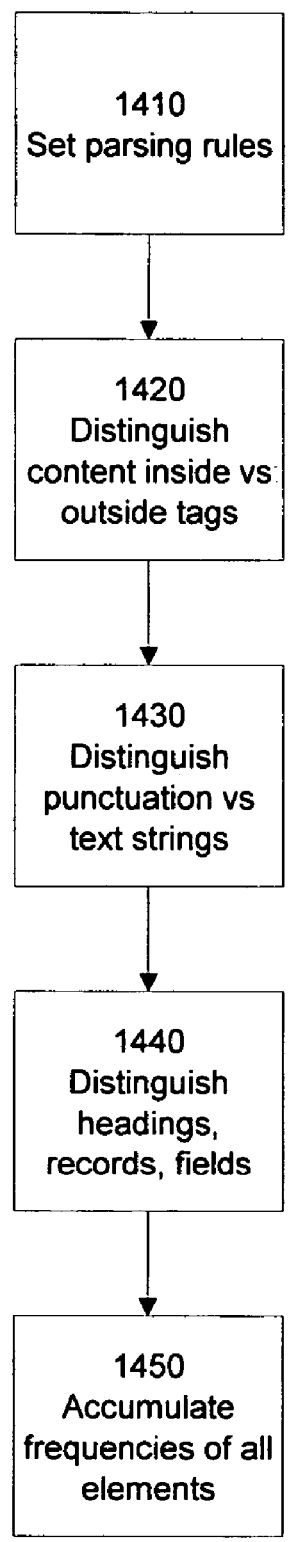
Figure 14: Accumulate parameters and token frequencies (1310)

Figure 15: Build token list and frequencies (1320)
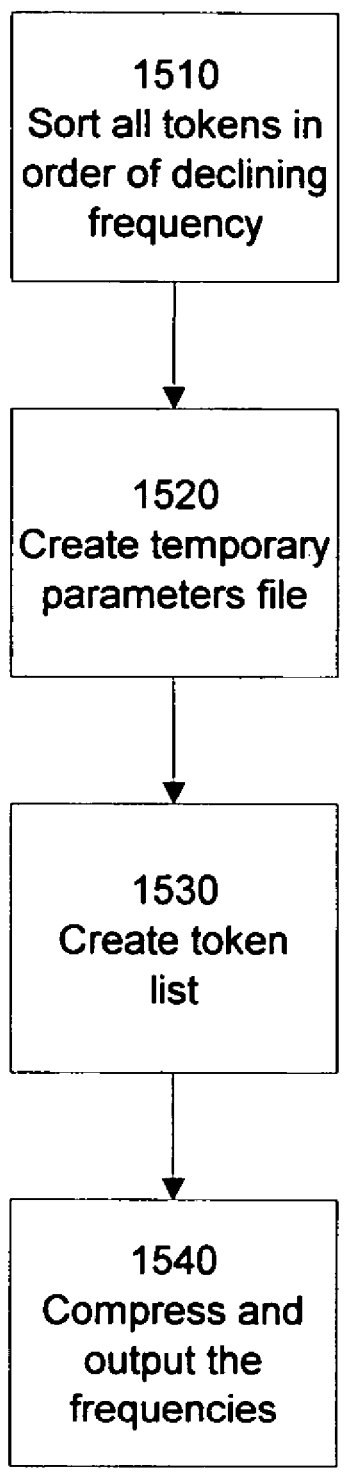

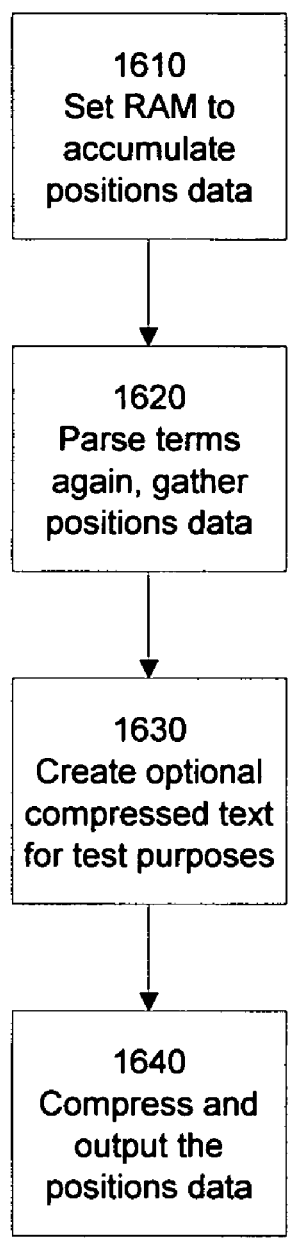
Figure 16: Accumulate positions data (1330)

Figure 17: Combine tokens, frequencies, positions, parameters into one compression index ebook (1340)
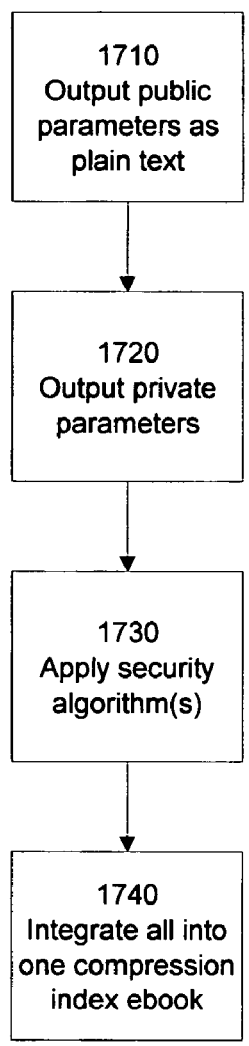

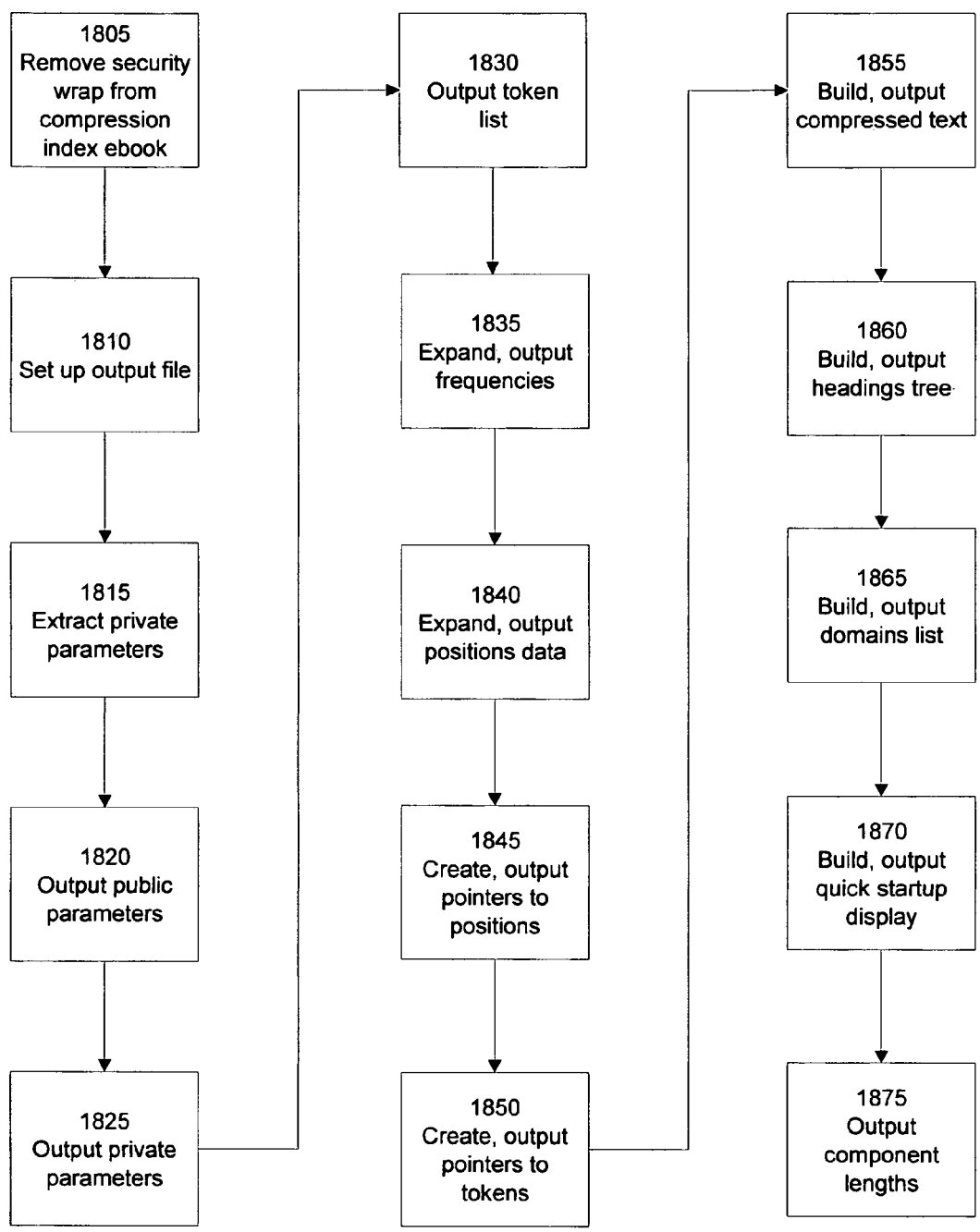

Figure 19: Procedure to browse in a compression index ebook (0140)
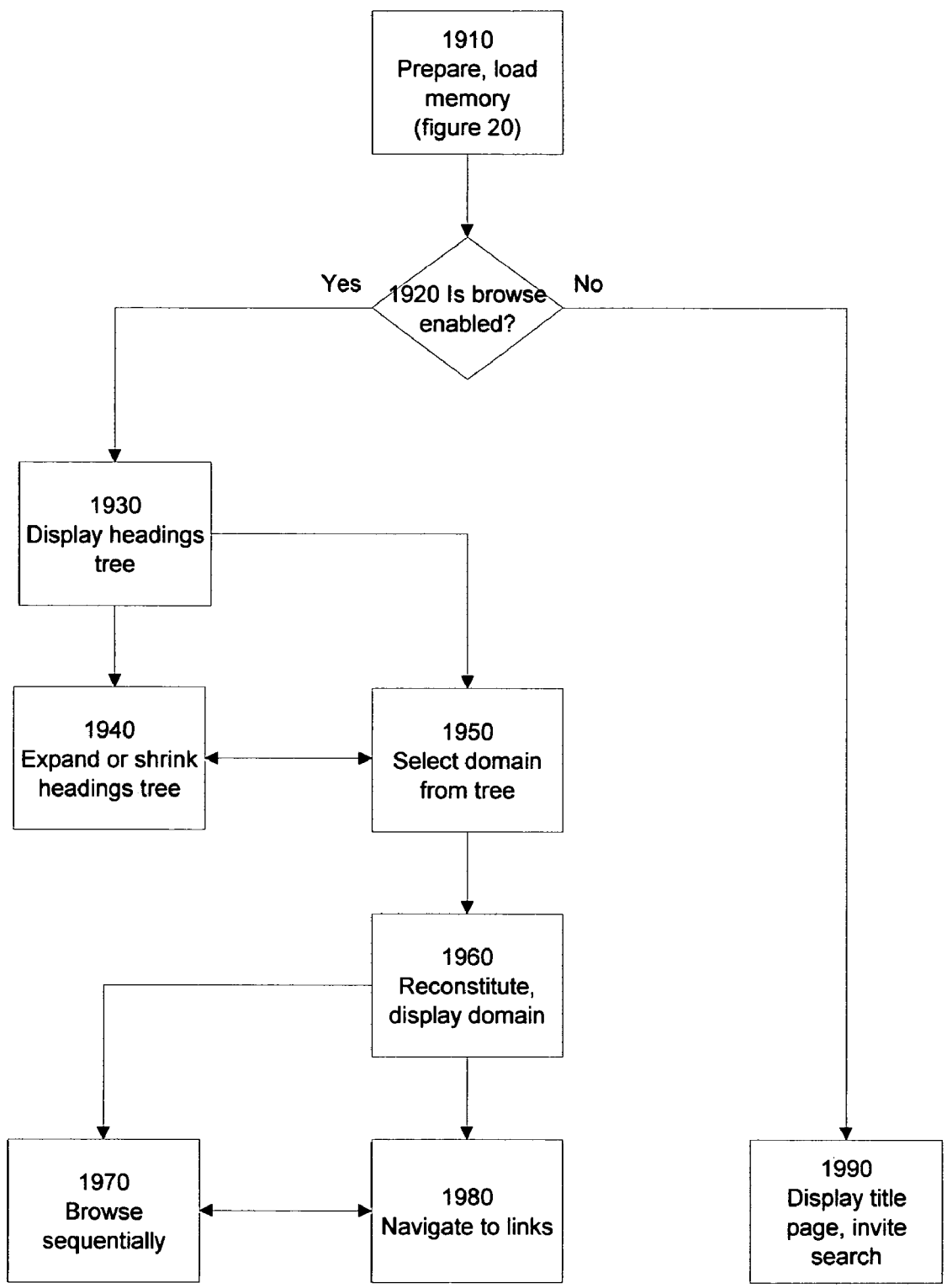

Figure 20: Prepare, load memory (1910)
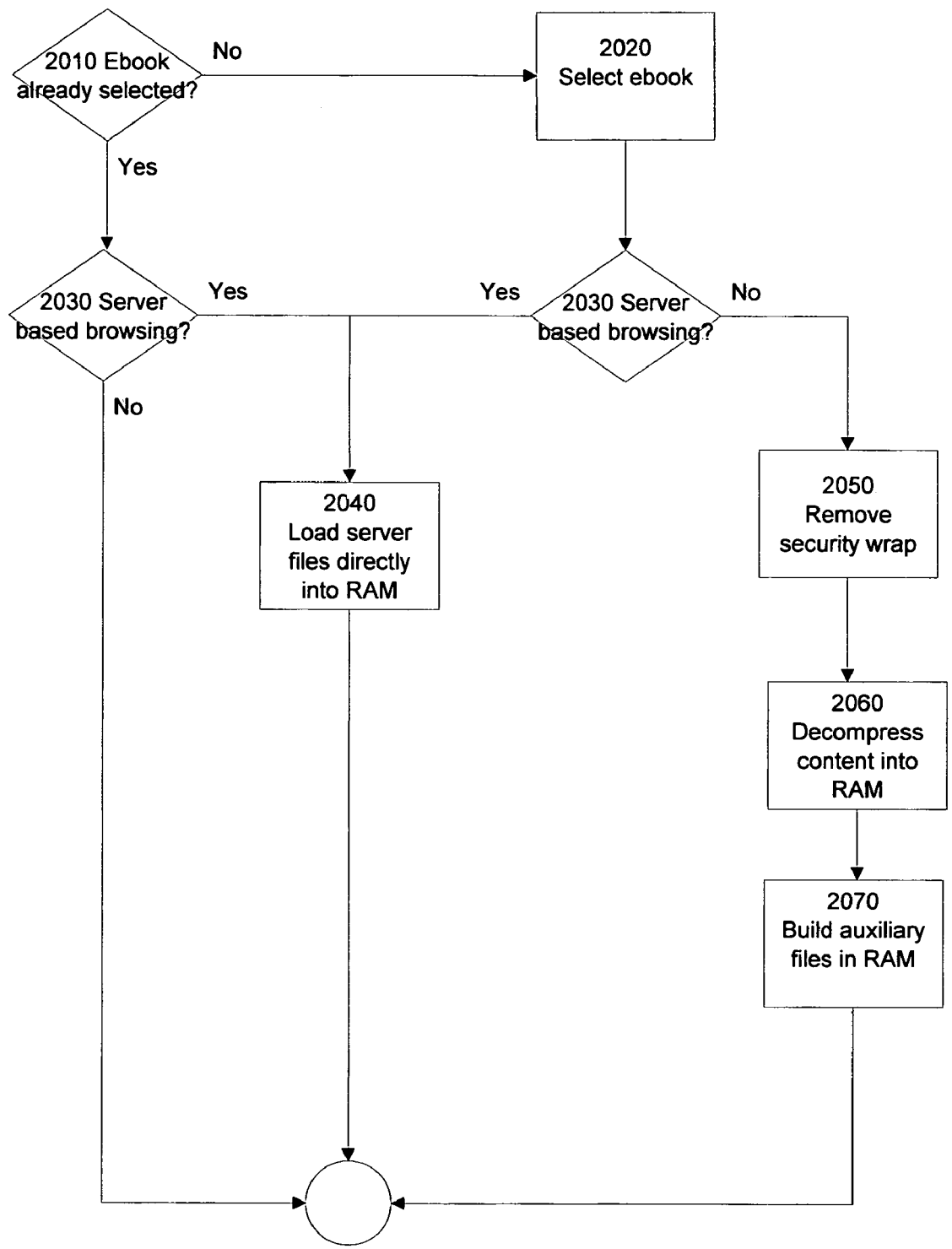

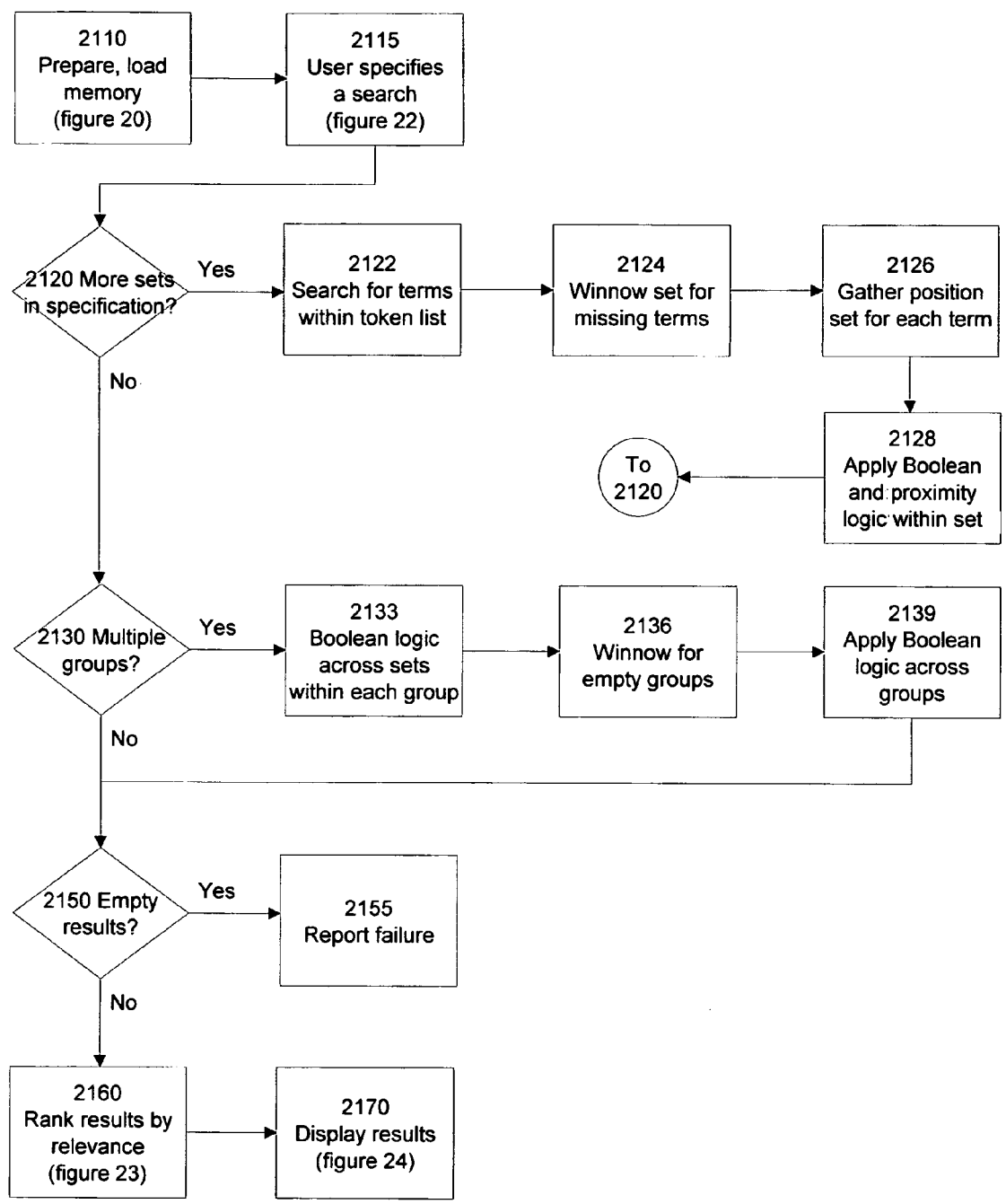

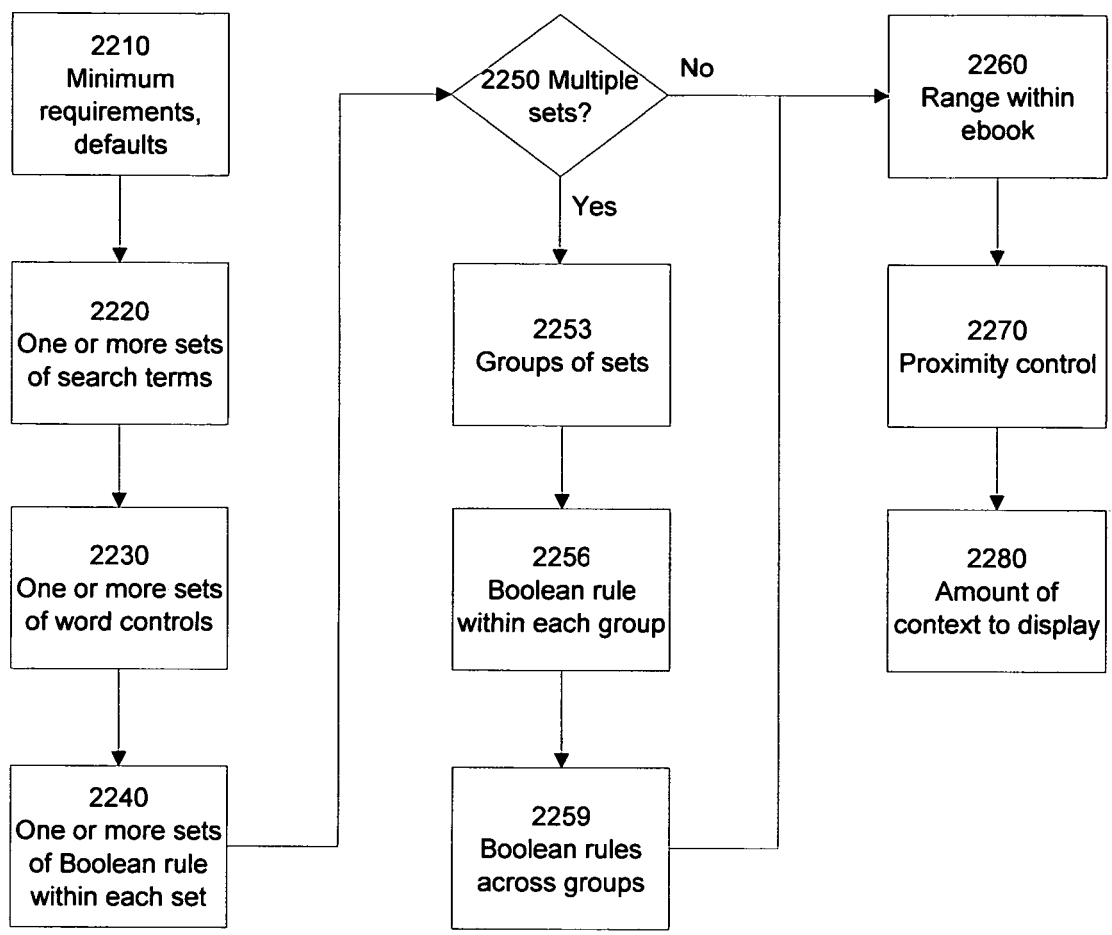
Figure 22: User specifies a search (2115)

Figure 23: Rank results by relevance (2160)
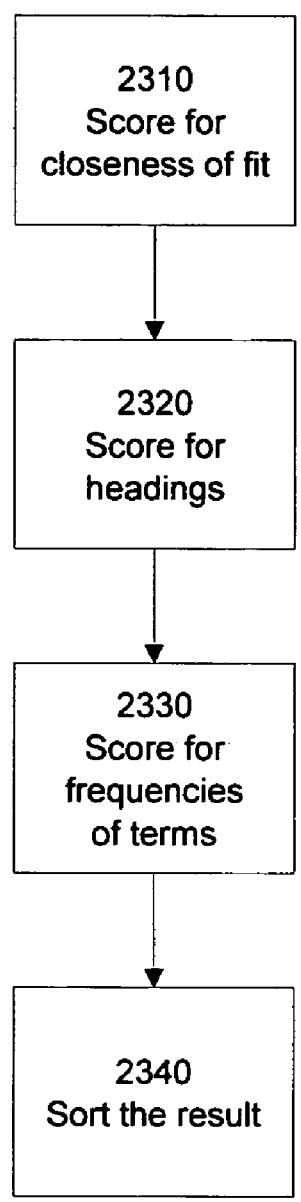

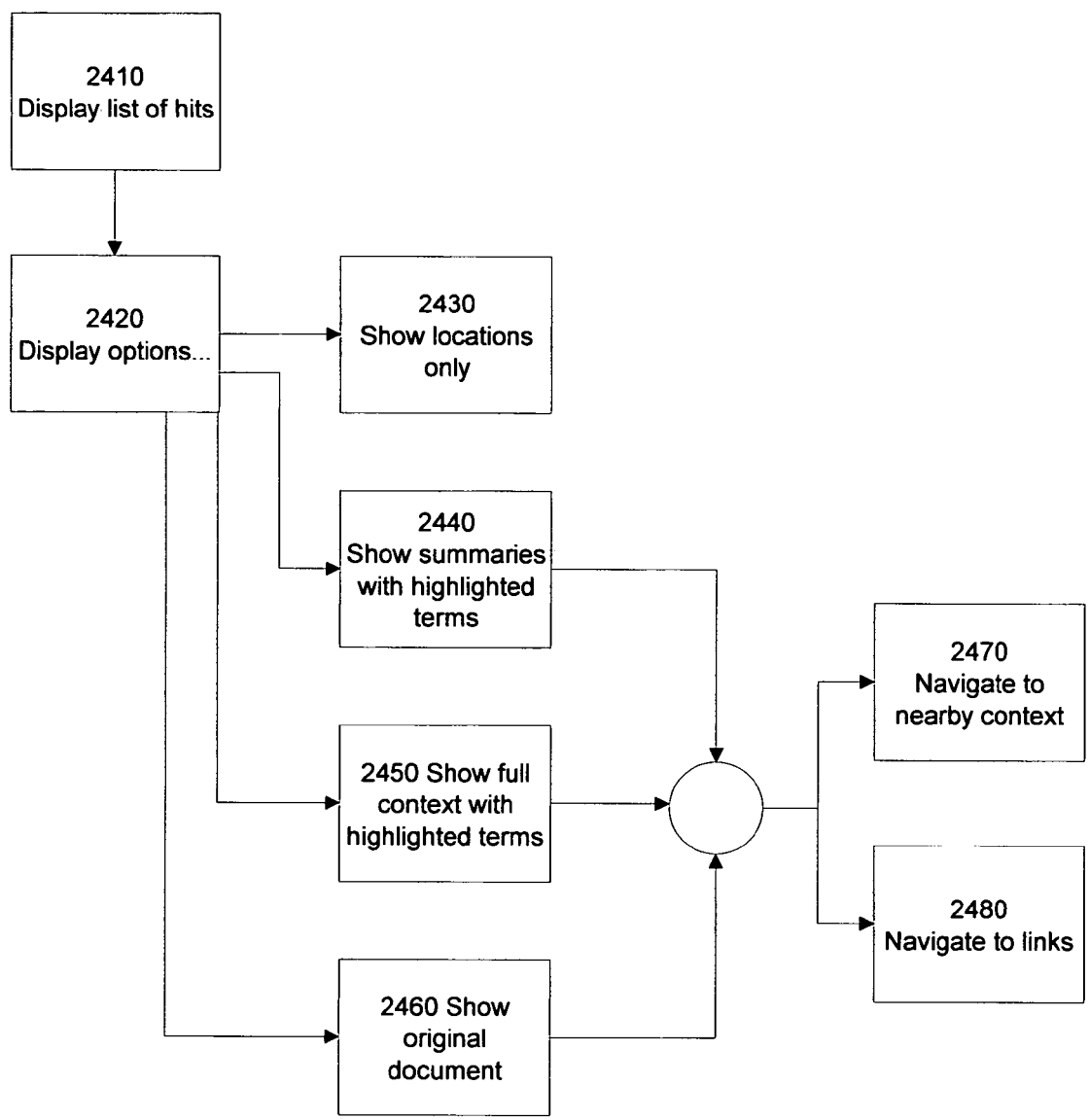
Figure 24: Display results (2170)

Figure 25 Table of Figures and Identification Numbers

Figure 01: Efficient proximity search of text

0110: Theoretical foundations (figures 02 to 06)

0120: Procedure to prepare target text (figures 07 to 12)

0130: Procedure to create a compression index ebook (figures 13 to 18)

0140: Procedure to browse in a compression index ebook (figures 19 to 20)

0150: Procedure to search in a compression index ebook (figures 21 to 24)

Figure 02: Theoretical foundations (0110)

0210: The primitives of search (figure 03)

0220: Conventional relevance ranking of search results (figure 04)

0230: Relevance ranking and meaning (figure 05)

0240: A compression index ebook (figure 06)

Figure 03: The primitives of search (0210)

0310: Tokens

0320: Frequencies

0330: Positions

Figure 04: Conventional relevance ranking of search results (0220)

0410: Conventional methods

0420: Insert editorial metadata

0430: Map relevance to popularity

0440: Map relevance to monetary payments

0443: Sponsorship

0446: Clandestine sponsorship

0449: Sale of search terms

0460: Content providers respond

0465: Attempts to influence ranking

Figure 05: Relevance ranking and meaning (0230)

0510: Start with needs of searchers

0520: Take into account word frequencies

0530: Take into account hierarchies of headings

0535: Take into account domains

0540: Measure closeness of fit

0550: The proximity conundrum

0560: Time out for disk seeks

0570: The compression solution

Figure 06: A compression index ebook (0240)

0610: Compress a single integer

0620: Primitive # 1 Tokens

0623: Define token parsing rules

0626: Rank order the tokens used

0629: Flag the tokens for speed

0630: Primitive # 2 Frequencies

0635: Compress the frequencies

0640: Primitive # 3 Positions

0643: Compressed text

0646: Compress the positions

0650: Facilitate with parameters

0653: Public parameters

0656: Private parameters

0659: Compress the private parameters

0660: Discard the text

Figure 07: Procedure to prepare target text (0120)

0710: Select target text (figure 08)

0720: Ensure computer accessibility of text (figure 09)

0730: Analyze text (figure 10)

0740: Preprocess text (figure 11)

0750: Assure text quality (figure 12)

Figure 08: Select target text (0710)

0810: Identify document(s)

0820: Quantity to include

0830: Current technical considerations

0840: Example

Figure 09: Ensure computer accessibility of text (0720)

0910: Machine readable?

0920: Scan paper document(s)

0930: Assemble by copying and pasting

0940: Plain text?

0950: Decrypt coded materials

Figure 10: Analyze text (0730)

1010: Factors related to computer file type

1020: Factors related to natural language

1030: Factors related to text quality

1040: Factors related to markup

1050: Factors related to tables, lists, and formatting

1060: Factors related to graphic elements

1070: Factors related to hierarchies of headings

1080: Factors related to domains and units of search

1090: Factors related to fielded text

Figure 11: Preprocess text (0740)

1110: Goals of preprocessing

1120: Minimum required results

1130: Translate from word processing codes

1140: Extract text

1150: Recognize formats

1160: Insert format tags

1170: Insert heading tags

1180: Insert search unit descriptors

1190: Balance the tags

Figure 12: Assure text quality (0750)

1210: Report non-printable characters

1220: Report inappropriate angle brackets

1230: Report failures in nesting order of tag pairs

1240: Report domain issues

1250: Report statistics

Figure 13: Procedure to create a compression index ebook (0130)

1310: Accumulate parameters and token frequencies (figure 14)

1320: Build token list and frequencies (figure 15)

1330: Accumulate positions data (figure 16)

1340: Combine above into one compression index ebook (figure 17)

1350: Build optional server-ready files (figure 18)

Figure 14: Accumulate parameters and token frequencies (1310)

1410: Set parsing rules

1420: Distinguish content inside vs. outside tags

1430: Distinguish punctuation vs. text strings

1440: Distinguish headings, records, fields

1450: Accumulate frequencies of all elements

Figure 15: Build token list and frequencies (1320)

1510: Sort all tokens in order of declining frequency

1520: Create temporary parameters file

1530: Create token list

1540: Compress and output the frequencies

Figure 16: Accumulate positions data (1330)

1610: Set RAM to accumulate positions data

1620: Parse terms again, gather positions data

1630: Create optional compressed text for test purposes

1640: Compress and output the positions data

Figure 17: Combine tokens, frequencies, positions, parameters into one compression index ebook (1340)

1710: Output public parameters as plain text

1720: Output private parameters

1730: Apply security algorithm(s)

1740: Integrate all into one compression index ebook

Figure 18: Build optional server-ready files (1350)

1805: Remove security wrap from compression index ebook

1810: Set up output file

1815: Extract private parameters

1820: Output public parameters

1825: Output private parameters

1830: Output token list

1835: Expand, output frequencies

1840: Expand, output positions data

1845: Create, output pointers to positions

1850: Create, output pointers to tokens

1855: Build, output compressed text

1860: Build, output headings tree

1865: Build, output domains list

1870: Build, output quick startup display

1875: Output component lengths

Figure 19: Procedure to browse in a compression index ebook (0140)

1910: Prepare, load memory (figure 20)

1920: Is browse enabled?

1930: Display headings tree

1940: Expand or shrink headings tree

1950: Select domain from tree

1960: Reconstitute, display domain

1970: Browse sequentially

1980: Navigate to links

1990: Display title page, invite search

Figure 20: Prepare, load memory (1910)

2010: Ebook already selected?

2020: Select ebook

2030: Server based browsing?

2040: Load server files directly into RAM

2050: Remove security wrap

2060: Decompress content into RAM

2070: Build auxiliary files in RAM

Figure 21: Procedure to search in a compression index ebook (0150)

2110: Prepare, load memory (figure 20)

2115: User specifies a search (figure 22)

2120: More sets in specification?

2122: Search for terms within token list

2124: Winnow set for missing terms

2126: Gather position set for each term

2128: Apply Boolean and proximity logic within set

2130: Multiple groups?

2133: Boolean logic across sets within each group

2136: Winnow for empty groups

2139: Apply Boolean logic across groups

2150: Empty results?

2155: Report failure

2160: Rank results by relevance (figure 23)

2170: Display results (figure 24)

Figure 22: User specifies a search (2115)

2210: Minimum requirements, defaults

2220: One or more sets of search terms

2230: One or more sets of word controls

2240: One or more sets of Boolean rule within each set

2250: Multiple sets?

2253: Groupings of sets

2256: Boolean rule within each group

2259: Boolean rules across groups

2260: Range within ebook

2270: Proximity control

2280: Amount of context to display

Figure 23: Rank results by relevance (2160)

2310: Score for closeness of fit

2320: Score for headings

2330: Score for frequencies of terms

2340: Sort the result

Figure 24: Display results (2170)

2410: Display list of hits

2420: Display options...

2430: Show locations only

2440: Show summaries with highlighted terms

2450: Show full context with highlighted terms

2460: Show original document

2470: Navigate to nearby context

2480: Navigate to links

METHOD AND SYSTEM FOR COMPRESSION INDEXING AND EFFICIENT PROXIMITY SEARCH OF TEXT DATA

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever. Further, a computer program listing appendix is submitted herewith on a compact disc, having subdirectories and files as follows. At the root level there is one file and four subdirectories. The one file is Readme.txt. The four subdirectories are "EBook Maker source code," "EBook Viewer source code," "Other source code," and "Sample Files."

Subdirectory "EBook Maker source code" contains the following files: AddToStack.cpp; AnalyzeTag.cpp; BodyLimits.cpp; CompressParams.cpp; DateToSeconds.cpp; Fr_c_int.cpp; FromHex.cpp; HexToDec.cpp; Index1.cpp; Index2.cpp; Index2B.cpp; Index3.cpp; Index4.cpp; Index6.cpp; Index7.cpp; InitParams.cpp; LoadFileInRam.cpp; MergeLists.cpp; MrIndex.cpp; MrIndex.h; NextToken.cpp; OrphanTags.cpp; ReadTemplate.cpp; ShowContext.cpp; To_c_int.cpp; ucncmp.cpp.

Subdirectory "EBook Viewer source code" contains the following files: AbandonShip.cpp; ANDAcrossIterations.cpp; AndNOT.cpp; ANDWithin.cpp; ASCIIToTokens.cpp; AssignHP.cpp; BuildComprText.cpp; BuildDomains.cpp; BuildHdList.cpp; CallSearchCode.cpp; Comp_Int.cpp; Compare.cpp; CompLong.cpp; DoBrowse.cpp; EvaluateProximity.cpp; Fr_c_Int.cpp; GetDomain.cpp; GetDomainData.cpp; GetNybbleColor.cpp; GetWordScore.cpp; HexToDec.cpp; InflateText.cpp; InflateWithColors.cpp; InitParam.cpp; LoadVectors.cpp; LocateXWordRange.cpp; MakeStringPointers.cpp; MergeIntLists.cpp; OutputTagsOnly.cpp; ParseRules.cpp; PrepareDisplay.cpp; ReadIndex.cpp; ReadParam.cpp; ReleaseMemory.cpp; SetNybbleColor.cpp; SetUpMemory.cpp; ShowHome.cpp; ShowSummary.cpp; ShowWithColors.cpp; SrFind.cpp; SrFind.h; StdAfx.cpp; stdafx.h; To_c_int.cpp; TokensToPositions.cpp; WithinDFN.cpp.

Subdirectory "Other source code" contains the following files: ApplyRangeFilter.cpp; DeviseRangeFilter.cpp; GetPlainText.cpp; MrVerify.cpp; ReconCText.cpp Subdirectory "Sample Files" contains the following files: Domains.txt; Headings.txt; P2AGuide.txt. All contents of the compact disc are incorporated herein by reference.

FIELD OF THE INVENTION

This invention relates to a method and system of compression indexing and efficient proximity search of text data sets. Compression indexing makes text redundant once it has been indexed, since the text may be reconstituted from the index (hereinafter termed "compression index ebook"). The method further does away with the many disk seeks associated with checking closeness of words in records found through traditional techniques of proximity search. The method also enables efficient relevance ranking of search results according to closeness of desired terms within each portion of text found.

The field of computational linguistics is very broad; so too is its subsidiary discipline of text search. It is a well-known fundamental characteristic of most natural languages that adjacency of words bears directly on meaning of the combined words. Therefore the focus here is more precisely on efficient techniques for computation of "closeness of fit" of desired terms with a view to enhancing the ability of the searcher to arrive at results that conform to intended meaning.

BACKGROUND OF THE INVENTION

In an article entitled *Search Day-Closer Closer Closer* dated May 22, 2001, Chris Sherman, Associate Editor of www.searchenginewatch.com, characterized a key dilemma of persons using computer-based search engines to find meaning:

Both phrase searching and the NEAR operator offer simple but effective ways to take more control over your search. They only work in rather restricted circumstances. But they can often mean the difference between finding what you're looking for and wishing your results were closer, closer, closer.

Unfortunately, most search engines never had or have abandoned the "near" option. According to Chris Sherman, AltaVista appears alone among the major search engines in offering this capability. As of February 2004, if one experiments with the AltaVista advanced search option, one finds that no control is offered to the searcher over what is meant by the operator "NEAR."

Occasional references can be found to proximity search systems that allow the user to specify within how many words of each other that specified words are to be found. See for example, http://www.wcsu.ctstateu.edu/library/odlis.html#proximity:

The search software of some bibliographic databases allows a proximity operator to be used in search statements to specify that a record will be retrieved only if the keywords typed as search terms appear within a designated number of words of each other, or within the same sentence or paragraph. The proximity operator is not standardized (in some databases it is 'adj' for adjacent to, in others it is 'w' for with).

Example: publication adj1 date or publication w1 date

In the example given above, the query will retrieve records in which the word 'publication' appears within one word of 'date,' for example, records containing the phrase date of publication or publication date (or both) and also date for publication, publication and date, publication to date, etc.

These bibliographic search systems function effectively only across relatively small databases. They also tend to be table driven. They offer no solution for search across large sets of text data.

These examples are representative of the dilemma faced by persons searching in large quantities of text. Four problems face the user of conventional search engines for large text data sets. (a) FALSE NEGATIVES: The only proximity control commonly available is to specify "exact phrase"; this results in relevant material that is missed because it contains intervening words or the words are not in the precise order specified. For example, a search for the exact phrase "that they may be one" would miss inexact phrases such as "that they may all be one" or "may be that they should become one". (b) GOOD FINDINGS BURIED AMONG AN OVERWHELMING NUMBER OF FALSE POSITIVES: A request for "all the words" results in an avalanche of unhelpful results in which the specified search terms are widely spread out and do not relate to the meaning desired by the searcher. (c) LACK OF CONTROL OVER ADJACENCY: In search engines in which a "near" option is offered, the searcher may have limited control over the extent of adjacency, and presentation of the result of the search may be poorly ranked or (worse) inaccurate. (d) DELAY: There is an inherent problem in proximity search, not solved prior to the instant invention—delay in the reporting of results caused by the requirement in older methods for a multiplicity of disk seeks in order to verify the actual distance between words in each and every record. These disk seeks also multiply the computing resources required to satisfy search requests.

The normal tradeoff in search across large quantities of text is to sacrifice accuracy for speed. Current search engines generally are very fast at finding records, but are woefully deficient at checking how close words are together in a record. The older "proximity search" methods would fetch every record that held the desired words at any distance, and check proximity; this process used excessive computer resources. Hence without proximity control the user is left with the job of pouring through all the records found. To save resources, and thereby to annoy people, is a poor solution to a problem that confronts literally millions of computer users every day.

Without a solution to the technical problem underlying computation of adjacency, the problem will worsen. We are experiencing exponential growth in the world supply of searchable data.

None of compression, indexing, or electronic books (ebooks) are new. However, the combination of the three in a system to enable efficient proximity search across large and growing quantities of text is novel.

What is needed, and desirable, is a system and method of response to text search requests which can return nearly immediate responses and apply relevance ranking based on closeness of fit (the best surrogate for meaning) to large quantities of text. One hundred percent compression of the text (i.e., eliminating the text) combined with other techniques would convey additional benefits in size of data handled, responsiveness in terms of speed of search, portability of results, fully formatted browsing, and convenience.

SUMMARY OF THE INVENTION

A system and method of compression indexing and efficient proximity search of text data permits very high speed search which features ranking the relevance of search results according to closeness of desired terms within each portion of text found. The system includes procedures to: (a) prepare target text, (b) create a "compression index ebook", (c) browse in a compression index ebook, and (d) search in a compression index ebook.

Accordingly, it is an objective of the present innovation to enable proximity-based relevance ranking in results of search across large quantities of text data.

It is also an objective to provide means to reconstitute fully formatted text entirely from an compression index ebook, so that the text itself may be discarded (one hundred percent compression).

Further, it is an objective of the present innovation to overcome the design-based inefficiencies that have caused many search engines to abandon proximity.

Still yet another objective of the present innovation is to enable detection of inexact phrases, findings that are lost under "exact phrase" strictures—precise word order with zero intervening words.

Another objective of the present innovation is increase the control available to searchers of text, so that they may specify precisely the degree of adjacency desired among search terms, and see search results ranked clearly by the degree of adjacency, a powerful surrogate of intended meaning.

Still yet another objective of the present innovation is to equip any person or organization to produce fully featured compressed ebooks suitable for distribution over the Internet.

Another objective of the present innovation is to equip Internet sites to generate proximity-based indexes of, and gain exposure for, their current content.

It is yet another object of the present invention to provide a method of compression indexing, comprising the steps of:
  selecting at least one data file;
  identifying tokens, each of the tokens having a frequency;
  counting the frequency of each token;
  calculating parameters;
  ranking the tokens from highest frequency to lowest frequency;
  compressing the frequencies;
  assigning a position to each instance of each token;
  compressing the positions; and,
  aggregating tokens, frequencies, parameters, and positions to form a compression index ebook.

Still, another object of the present invention is to provide a method of compression indexing, wherein the token is a word.

Further yet, another object of the present invention is to provide a method of compression indexing, wherein the token is a string of punctuation characters.

Another object of the present invention is to provide a method of compression indexing, wherein the token is a markup tag with no blanks.

Further, another object of the present invention is to provide a method of compression indexing, further comprising the step of searching the compression index ebook.

Still yet, another object of the present invention is to provide a method of compression indexing, wherein searching occurs in random access memory.

Another object of the present invention is to provide a method of compression indexing, wherein the step of searching the compression index ebook may be performed without disk seeks.

It is also another object of the present invention to provide a method of compression indexing, wherein the step of compressing the positions to form a compression index ebook, the position of the first instance of each token is absolute, and the position of each subsequent instance of the same token is relative to the preceding position.

Further yet, another object of the present invention is to provide a method of compression indexing, wherein the compression index ebook comprises an exhaustive index of every token, the compression index ebook adapted to derive closeness-of-fit measures, the compression index ebook also adapted to reproduce any portion of original text for display.

Another object of the present invention is to provide a method of compression indexing, further comprising the steps of reconstituting a portion of the data file; and displaying the portion of the data file on a screen.

Still, another object of the present invention is to provide a method of compression indexing, wherein compressed positions of the data file point to a compressed text random access memory file, the step of reconstituting the data file further comprising the steps of:
  a. loading the compressed text RAM file;
  b. selecting a domain to display, the domain being a portion of the data file, the domain having a starting point and an ending point;
  c. decompressing successive integers;
  d. determining positions of the tokens in the token list;
  e. extracting the tokens from the token list;
  f. writing the tokens to the screen; and
  g. repeating steps c-f until the ending point of the domain is reached.

Another object of the present invention is to provide a method for compression indexing, wherein the selected domain is part of a domains list, the domains list having a plurality of domains, the domains list having the starting point and the ending point of each domain.

Further, another object of the present invention is to provide a method for compression indexing, further comprising the step of ranking search results by relevance, wherein relevance is determined by the closeness of fit of search terms, headings, and frequencies of search terms.

Still another object of the present invention is to provide a method for compression indexing, further comprising the step of browsing the compression index ebook, wherein an associated user is able to sequentially read content of the compression index ebook starting at any point.

Another object of the present invention is to provide a method for using a compression index ebook, comprising the steps of:
  a. creating the compression index ebook having the steps of:
    (i) providing target text, the target text being at least one data file, the target text having tokens, the tokens having frequencies;
    (ii) accumulating parameters;
    (iii) building a list of all tokens represented in the target text, together with their respective frequencies;
    (iv) sorting the list in order of declining token frequencies;
    (v) accumulating positions data of each instance of each token; and
    (vi) combining steps i-v into the compression index ebook;
  b. browsing and searching the compression index ebook.

Still yet, another object of the present invention is to provide a method for using a compression index ebook wherein browsing and searching occurs on a personal computer.

Another object of the present invention is to provide a method for using a compression index ebook, wherein browsing and searching is server based over an Internet.

Further yet, another object of the present invention is to provide a method for using a compression index ebook, wherein the steps of accumulating parameters comprises accumulating parameters and token frequencies on a single pass through the at least one data file, the data file having lightly marked up text, wherein the single pass through of the at least one data file of lightly marked up text comprises input for the compression index ebook.

It is also another object of the present invention to provide a method for using a compression index ebook, wherein the step of building a list of all tokens represented in the target text, together with their respective frequencies further comprises the steps of:
  sorting all tokens in order of declining frequency;
  creating a temporary parameters file to facilitate passing parameters between successive states of the method to create the compression index ebook;
  parsing the target text as a means for creating the token list, each of the tokens having a flag byte preceding the token and a null byte following the token; and
  compressing and outputting the frequencies of tokens.

Further, another object of the present invention is to provide a method for using a compression index ebook, wherein the step of accumulating positions data further comprises the steps of:
  reserving a block of random access memory to accumulate positions data;
  reparsing the entire data file;
  recording the position of all tokens in the random access memory block; and
  compressing and outputting the positions data, wherein the position of the first instance of each token is absolute, and the position of each subsequent instance of the same token is relative to the preceding position.

Still, another object of the present invention is to provide a method for using a compression index ebook, wherein the step of combining steps (i)-(v) into one compression index ebook, further comprises the steps of:
  outputting public parameters as plain text at a beginning of the compression index ebook;
  outputting compressed private parameters; and
  appending the tokens, frequencies and positions to complete the compression index ebook.

Another object of the present invention is to provide a method for using a compression index ebook, wherein numeric values assigned to successive tokens from the data file are compressed and successively appended to create a compressed text random access memory file, wherein the random access memory file is computationally equivalent to the target text such that the positions within this compressed text random access memory file are used as the position values of successive tokens.

Still yet, another object of the present invention is to provide a method for using a compression index ebook, wherein positions are compressed, compressed positions of the data file point to a compressed text random access memory file, the method further comprising the step of reconstituting the data file to browse and search the compression index ebook comprising the steps of:
  a. loading the compressed text RAM file;
  b. selecting a domain to display, the domain being a portion of the data file, the domain having a starting point and an ending point, wherein the selected domain is part of a domains list, the domains list having a plurality of domains, the domains list having the starting point and the ending point of each domain;
  c. decompressing successive integers;
  d. determining positions of the tokens in the token list;
  e. extracting the tokens from the token list;
  f. writing the tokens to the screen; and
  g. repeating steps c-f until the ending point of the domain is reached.

Another object of the present invention is to provide a method for using a compression index ebook, wherein the step of combining steps (i)-(v) into one compression index ebook, further comprises the steps of:
  outputting public parameters as plain text at a beginning of the compression index ebook;
  outputting compressed private parameters; and
  appending the tokens, frequencies and positions to complete the compression index ebook.

It is yet another object of the present invention is to provide a method for using a compression index ebook, wherein numeric values assigned to successive tokens from the data file are compressed and successively appended to create a compressed text random access memory file, wherein the random access memory file is computationally equivalent to the target text such that the positions within this compressed text random access memory file are used as the position values of successive tokens.

Still, another object of the present invention is to provide a method for using a compression index ebook, wherein positions are compressed, compressed positions of the data file point to a compressed text random access memory file, the method further comprising the step of reconstituting the data file to browse and search the compression index ebook comprising the steps of:
a. loading the compressed text RAM file;
b. selecting a domain to display, the domain being a portion of the data file, the domain having a starting point and an ending point, wherein the selected domain is part of a domains list, the domains list having a plurality of domains, the domains list having the starting point and the ending point of each domain;
c. decompressing successive integers;
d. determining positions of the tokens in the token list;
e. extracting the tokens from the token list;
f. writing the tokens to the screen; and
g. repeating steps c-f until the ending point of the domain is reached.

Further, another object of the present invention is to provide a method for using a compression index ebook, wherein searching the compression index ebook comprises the step of scoring for closeness of fit of search terms by measuring the number of waste words that intervene between the first and last term found within a domain, and subtracting the count of waste words from the maximum allowable value.

Another object of the present invention is to provide a method for using a compression index ebook, wherein searching the compression index ebook comprises the step of scoring for headings.

Further yet, another object of the present invention is to provide a method for using a compression index ebook, wherein searching the compression index ebook comprises the step of scoring for frequencies of search terms.

Still, another object of the present invention is to provide a method for using a compression index ebook, further comprising the step of ranking search results from the domain with the highest score to lowest score, wherein scores equal the sum of closeness of fit, frequency of search terms in heading and frequency of terms in the domain, wherein search results are displayed as a list of hits arranged in order of closeness of fit and with frequency of occurrence in headings and body controlling the ranking when the number of waste words is the same for multiple domains.

Further yet, another object of the present invention is to provide a computer readable medium containing instructions for controlling a computer system to perform a method, the method comprising the steps of:
selecting at least one file;
identifying tokens, each of the tokens having a frequency;
counting the frequency of each token;
calculating parameters;
ranking the tokens from highest frequency to lowest frequency;
compressing the frequencies;
assigning a position to each instance of each token;
compressing the positions;
aggregating tokens, frequencies, parameters, and positions to form a compression index ebook; and
browsing and searching the compression index ebook.

Still yet, another object of the present invention is to provide an apparatus, comprising:
means for selecting at least one file;
means for identifying tokens, each of the tokens having a frequency;
means for counting the frequency of each token;
means for calculating parameters;
means for ranking the tokens from highest frequency to lowest frequency;
means for compressing the frequencies;
means for assigning a position to each instance of each token;
means for compressing the positions; and
means for aggregating tokens, frequencies, parameters, and positions to form a compression index ebook; and
browsing and searching the compression index ebook.

Still other benefits and advantages of the invention will become apparent to those skilled in the art to which it pertains upon a reading and understanding of the following detailed specification.

BRIEF DESCRIPTION OF DRAWINGS

The figures listed below have been selected to illustrate a preferred embodiment of the present invention. These figures along with the accompanying description and the appended computer program listing of core processes are sufficient for those skilled in the art to practice the invention as claimed. Note that all entities and actions within the drawings are designated by four digit numbers. In all cases, the first two digits are the figure number in which the action or entity is introduced. Hence each entity or action discussed in this document can be related directly to a specific drawing. In turn, all drawings except the first relate back to a previously discussed action or entity. All figures, and all boxes within each figure, are discussed in numeric order below.

The invention may take physical form in certain parts and arrangement of parts, a preferred embodiment of which will be described in detail in this specification and illustrated in the accompanying drawings which form a part hereof and herein:

FIG. 01 is a diagram providing an overview of the component parts of the system and method; it refers to the theoretical foundations, then to four procedures that provide functionality;

FIG. 02 is a diagram that expands on the reference to theoretical foundations 0110. FIG. 02 indicates three areas of foundational knowledge for the procedures that follow. In one case, conventional structures and methods are set in contrast to structures and methods particular to this new innovation;

FIG. 03 is a diagram that indicates the three primitives of search 0210. Noticeable by its absence is the target text, which is shown not to be an essential primitive;

FIG. 04 is a diagram detailing conventional methods of relevance ranking 0220 of search results;

FIG. 05 is a diagram detailing an alternative to conventional methods of relevance ranking of search results, an alternative 0230 that helps the searcher get at meaning;

FIG. 06 is a diagram that lays out the structure of a compression index ebook 0240;

FIG. 07 is a flow chart showing the stages of a procedure 0120 to prepare target text;

FIG. 08 is a diagram of considerations pertinent to the selection 0710 of target text;

FIG. 09 is a diagram showing means of gaining computer accessibility 0720 of target text;

FIG. 10 is a diagram of factors pertinent to the analysis 0730 of target text;

FIG. 11 is a flow chart showing the stages of preprocessing 0740 text;

FIG. 12 is a flow chart showing the stages of assuring quality 0750 of target text;

FIG. 13 is a flow chart showing the stages of a procedure 0130 to create a compression index ebook;

FIG. 14 is a flow chart showing how to accumulate parameters and token frequencies 1310;

FIG. 15 is a flow chart showing how to build the token list and frequencies 1320;

FIG. 16 is a flow chart showing how to accumulate positions data 1330 on the various terms in the text;

FIG. 17 is a flow chart showing how to combine 1340 tokens, frequencies, positions, and parameters into one compression index ebook;

FIG. 18 is a flow chart showing how to build optional files 1350 to use for searching and browsing from a server using an Internet browser interface;

FIG. 19 is a flow chart showing the procedure 0140 to browse in a compression index ebook 0240;

FIG. 20 is a flow chart showing the process of preparing and loading RAM (random access memory) 1910 in order to browse or search;

FIG. 21 is a flow chart showing the procedure 0150 to search in a compression index ebook 0240;

FIG. 22 is a diagram detailing options and considerations as a user specifies a search 2115;

FIG. 23 is a flow chart showing the procedure 2160 for ranking relevance;

FIG. 24 is a flow chart showing the procedure 2170 for displaying search results;

FIG. 25 is a table in numeric order of all entities and actions referenced in FIGS. 01 through 24 and in this document.

PREFERRED EMBODIMENT

Referring now to the drawings wherein the showings are for purposes of illustrating a preferred embodiment of the invention only and not for purposes of limiting the same, FIGS. 01-25 show the present invention. In order to facilitate the efforts of a person of ordinary skill in the art to implement this system and method, a set of C and C++ language source code functions is included in a computer program listing appendix submitted with this patent application.

The instant invention fulfills the strong need in the art for providing to searchers a combination of control over the proximity of search terms and high computational efficiency. The outcome is enhanced ability to find meaningful search results among large bodies of text.

With reference to FIG. 01, an overview of efficient proximity search of text is shown. FIG. 01 is a diagram providing an overview of a family of programs and related theoretical foundations 0110. There are four procedures that together incorporate the system and method of the instant invention. The four procedures cover the preparation 0120, creation 0130, browsing 0140, and searching 0150 of "compression index ebooks" 0240.

FIG. 02 is a diagram providing an overview of the theoretical foundations 0110, broken into components to facilitate learning by a person of ordinary skill in the art. First there is an examination of the primitives of search 0210. Primitives are those elements in a field of study which are in themselves essential, and from which all other elements may be derived. It turns out that there are only three such primitives, and the text is not one of them. FIG. 02 shows conventional techniques 0220 of ranking search results for presentation to the person searching. In contrast, this invention points to a method of relevance ranking 0230 that enhances the capacity of the searcher to derive meaningful results. Yet another theoretical foundation is the concept and structure of a compression index ebook 0240. The various elements introduced in FIG. 02 are elaborated upon in FIGS. 03 through 06.

FIG. 03 presents three primitives of search 0210, that is, the three elements which must be present in order to respond to the specifications set by a user who wishes to find material within a body of computer-readable text. These three primitives comprise an index. Any person with a secondary education would normally be familiar with the use of an index which appears at the back of a book. The index consists of a list of terms and sub-terms, together with one or more locations at which the term is to be found in the book.

The following example of an index entry is taken from page 469 of *Business@the Speed of Thought* by Bill Gates with Collins Hemingway (New York: Time Warner, 1999):

Training, 191, 248-250, 313, 328, 359, 368, 393-394
medical, 342, 354
military, 277-378

Training is the primary term. Sub-terms here are medical and military, that is, two aspects of the broader subject of training. Each entry is followed by one or more locations, in this case, page numbers or page ranges. All three primitives of search are represented in this example. The primitives are tokens 0310, frequencies 0320, and positions 0330. In this example, the tokens are words; the frequencies are implicit in the count of positions; the positions are page numbers. In the above example, the token "medical" has a frequency of two and is located at positions 342 and 354.

Indexes in books typically represent somebody's considered judgment (that of the author or some designated person) of what is particularly worth finding quickly within the book. Readers are accustomed to the fact that paper indexes tend to be partial. The word training may appear on other pages (that is, at other positions) within the above-cited book. The instant invention broadens the concept of an index so that (a) it includes every instance of every token 0310; (b) the reported frequency 0320 of each token 0310 exactly matches the count of occurrences; and (c) the positions 0330 are so precise that the individual location of every token is unique and distinguishable from neighboring tokens within even the same sentence or line.

Consider a paragraph of text. A paragraph of text consists typically of searchable terms with intervening spaces or punctuation strings. The first sentence of this paragraph consists of five words: "Consider a paragraph of text." The first four words are each followed by a space. The fifth word is followed by a punctuation string consisting of a period and a space. The token 0310 "Consider"—with the first letter capitalized—occurs at least once (has a frequency 0320 of at least one) in an index for this paragraph, with a position 0330 that could be recorded as position # 1 within the paragraph. Assume that a space is inferred automatically at the end of each token 0310 unless it is followed by a punctuation string. Then position # 2 in this paragraph is occupied by the token "a", position # 3 by the token "paragraph", position # 4 by the token "of", position # 5 by the token "text", and position 6 by the token (punctuation string in this case) of period-space.

It becomes clear that any body of text could be indexed with precision by use of the three primitives—tokens 0310, frequencies 0320, and positions 0330. The method in the preceding paragraph appears bulky; an index for an entire book stated in the above terms would be vastly larger than the book itself. In a hypothetical book, the token "the" might appear 23,417 times, starting at position 4 within paragraph 1 of page viii, position 19 within the same paragraph, etc., etc. for another 23,415 entries. The token consisting of punctuation string "period-end parenthesis-space-double quote" might be relatively infrequent, but it is amenable to indexing by the same set of primitives—token 0310, frequency 0320, and position 0330.

There are four advantages to indexing using the three primitives in an exhaustive, all-inclusive, and precise manner. (a) There is no need to apply time consuming human judgment of whether a term is worthy of being indexed. Therefore the process may be totally automated. In the earliest prototype of this indexing method, a megabyte of prepared text was indexed in well under one second. (b) Control in finding text passes to the person searching; the searcher is not made dependent on other persons' judgments of what matters. (c) Compression techniques in the instant invention typically reduce the index to little more than a third of the size of the plain text that is being indexed. (d) Most important of all, when text is indexed in this way, the text itself becomes redundant. Whatever text is needed to display results from a search or to permit browsing of a passage can be reconstituted from the index. Thus in the compression index ebook 0240 as described in FIG. 06 it is possible to discard the text 0660, resulting in one hundred per cent compression.

If text can be reconstituted from an index, then the text is not itself a primitive of search.

It can be derived whenever needed. This affects the size, transmissibility, and utility of compression index ebooks 0240.

FIG. 04 provides an overview of conventional relevance ranking of search results 0220. Relevance ranking consists of arranging the results of a search in a sequence, and then presenting the results or some subset of the results to the searcher, with the implicit understanding that the earlier a result appears in the list, the more important that result should be to the searcher. FIG. 04 describes what has been happening in the text search industry, as a backdrop to subsequent discussion of FIG. 05. A helpful resource for background on the search industry is found on the Internet at http://tbray.org/ongoing. Tim Bray is the Chief Technical Officer of Antarctica Systems Inc. The table of contents for his series of articles on search is found at http://tbray.org/ongoing/When/200x/2003/07/30/OnSearchTOC.

One of the conventional methods 0410 of relevance ranking is based on the insertion of editorial metadata 0420. Metadata is simply data that describes other data. Markup systems such as XML (Extensible Markup Language) and HTML (HyperText Markup Language) accommodate metadata through "metatags". For example, the "meta", "title", "keywords", "description", and "author" tags are used for this purpose in HTML. Tim Bray describes situations in which roomfuls of editors are engaged full time in making decisions about which key descriptors or topic names are appropriate for a passage of text. This process is expensive; the task is daunting in the face of exponential growth of the world supply of computerized text. Metadata may be used either as a supplement to, or as a replacement for, full text in a search index. Where it is a substitute, the searcher is entirely at the mercy of editorial opinion on the content. An underlying difficulty is that the meaning that matters is in the head of the searcher. This may or may not correspond to meaning attributed by an editor.

Another conventional method 0410 of relevance ranking has gained considerable favor —mapping relevance to popularity 0430 of the target text. In the Internet environment, it is relatively easy to measure the number of remote sites that point to a site (and possibly to a page at that site). The presumption is that the frequency of remote links to content is a measure of the meaningfulness of that content. Hence, frequently cited (or popular) content is assigned relatively high scores and therefore ranks high when found within a set of results returned by a search.

By far the most controversial among the conventional methods of relevance ranking 0410 is to rank search results based on monetary payments 0440 to the search engine provider. In mid-2002 the U.S. Federal Trade Commission "delivered its findings as a recommendation but indicated it could pursue legal action if the search engines don't build 'clear and conspicuous'distinctions between fee-based results and those produced by objective formulas." (Associated Press, Jul. 14, 2002). The industry acceded fairly quickly; openly sponsored links 0443 still appear at the top of search results, but since 2002 they have been labeled by some term such as "sponsored".

Unfortunately, there has been continued concern that monetary payments 0440 may still influence relevance ranking. Clandestine sponsorship 0446 in the form of "paid inclusions" was reported in a Business Week article and editorial on Oct. 6, 2003. MSN, Yahoo, and Lycos argued that search results are not distorted; the $200 million in revenue up to that date for paid inclusions affected only the frequency of refreshing the information from the sites in question. Google distanced itself from the practice. Critics of paid inclusion have pointed to evidence of sites rising higher in the rankings after their owners have made such payments.

As of early 2004, the growth area in monetary payments to search engine providers is the sale of search terms 0449. Here, too, controversy is high. French courts have made demands to American search providers that they stop the practice of displaying advertisements for competitors when search is for the name of a French product. Tensions run high within the United States as well. Do providers of a search engine display "ethical dyslexia" when they accept funds and provide preferential advertising space to the payee when the trademarked name of some third party is used as a search term? Here is a hypothetical example: A user searches for Avis Rental; the results are accompanied by an ad for Hertz Car Rentals. The ethical and the legal aspects of this argument may continue for some time. The obvious question: What does the thickness of a firm's wallet have to do with meaning that is sought by a searcher in text?

How have content providers responded 0460 to the conventional methods of relevance ranking 0410? The response has been a variety of attempts to influence ranking 0465. The phrase "Internet Marketing" has taken on a new meaning— consultation and courses on "Web site optimization and premium placement in each of the major search engines". This too has become a growth industry. E-commerce firms often depend on search engines to make potential clients aware of their offerings. Is metadata a basis? Then firms learn how to add metadata. Is popularity the basis for relevance ranking? Firms create extra sites that are loaded with links to their preferred target. Are clandestine payments accepted? Firms make the payments. All of these tactics pay scant attention to the needs of people wanting to conduct searches. A better way is needed in the industry, which is provided by the novel invention described herein.

FIG. 05 suggests alternative factors to take into account in relevance ranking 0230. Visualize the searcher as customer, and the search engine provider as supplier. The fairly obvious starting point is to focus on the needs of the searcher 0510 as customer. The customer is not likely to care much about editorial metadata, site popularity, or payments by third parties to the search engine provider. The customer simply wants results. The focus in FIG. 05 is to facilitate attempts to arrive at search results that are meaningful to the person carrying out the search. The searcher is the best judge of what shall be deemed meaningful. Meaning is conveyed through natural language (English, French, Swahili, or whatever). FIG. 05 suggests aspects of natural language that influence the perception of meaning: word frequencies 0520, positioning of text within a hierarchy of headings 0530, arrangement of written word within paragraphs (domains 0535 of meaning), and closeness of fit 0540 of search terms. FIG. 05 concludes with attention to why factors such as proximity are not commonly used—the proximity conundrum 0550, the time requirement for many disk seeks 0560, and the compression solution 0570 offered by the instant invention to overcome the conundrum.

The simplest factor is frequency 0520 of the specified term(s) within the selected passage. Example: If the phrase "short stop" and the word "batter" each appear three times in a paragraph, there is a higher probability that the paragraph is of interest to the searcher than if each term appears only once. There is every possibility that frequency is taken into account in conventional algorithms, but since these algorithms tend to remain proprietary, actual usage is unknown. Word frequency is used within the instant invention. Yet, while word frequency is useful, it is argued here that, it should not dominate relevance ranking. Other factors below are more powerful in the attempt to get at meaning.

Another factor that aids in arriving at meaning is to take into account the headings 0530 that relate to a passage of text. Headings are often arranged in a hierarchy. For example, a given paragraph may be found within a book, a chapter, a section of a chapter, and perhaps even a subsection. Markup languages facilitate hierarchies of headings. In HTML, a book title might be a heading level 1, a chapter name heading level 2, a section title heading level 3, etc. Sometimes words may appear in the headings and be missing in specific paragraphs. Helpful content may be missed in a search unless the headings are taken into account. The compression index ebooks of the instant invention accommodate the need to recognize context as expressed by heading titles.

In this context, a domain 0535 is defined as any subset of text likely to be focused in meaning. The most common unit in written natural languages is a paragraph. Two problems present themselves: paragraphs are not always clearly separated, and paragraphs are not always well written so as to focus on one topic. Recognized headings and subheadings more clearly divide the content of a body of text into domains. One of the goals of preprocessing (further on in 1110) is to divide text into domains in a reasonable way so that the words at the end of one domain need not be considered "near" the first words of the next domain. Domains 0535 are therefore units within which proximity or adjacency is meaningful.

The major factor that should be taken into account is closeness of fit 0540 of the specified search terms. This turns out to be the most powerful predictor of meaning in most natural languages. A natural language is any spoken and written language that may be used from early childhood onward as a means of communication among people. This patent application uses English as an example of a natural language. If one searches for information on vehicles that are powered by electricity, a search result that contains the two words (or part words) "electric" and "auto" 200 words apart from one another is not a likely candidate. If, however, the user can specify that records are to be retrieved only if the word stems are, for example, within 5 words of each other, there is a high probability that each such record will relate to the desired topic. In addition, by not stipulating "exact phrase", the user is shown variations such as "electric-gasoline hybrid automobile", "electric powered auto", "automobile runs on electricity", etc. A primary objective of this invention is to give precisely this type of natural language-based control to the person searching in large quantities of text. Note that normally-expected features such as complete Boolean logic across full text are present in the preferred embodiment as well. Therefore, this same example could lead to even better results if the searcher asked for "electric"AND ["auto" OR "vehicle" OR "car"] within five words.

A half hour of experimentation within conventional Internet-based search engines should be enough to convince any language-aware person that search would be vastly improved if proximity of terms (closeness of fit) 0540 were at the heart of relevance ranking. Taking into account other natural language features such as heading context 0530 and word frequencies 0520 strengthen these powerful search techniques even further.

As explained above in the section on Background of the Invention, these factors are not taken into account by the major search engines, with one partial exception . . . the NEAR option of AltaVista, which, unfortunately, is not controllable by the searcher. If natural language factors are so helpful in getting at meaning, why are they not commonly taken into account by search engines that deal with large quantities of text? The reason is a technical one. This might be labeled the "proximity conundrum" 0550; proximity is helpful, but it is not used. The reason is that conventional proximity techniques require review of every single record found to test the closeness of fit of the terms. This typically means a disk seek 0560 for each record found. With result quantities so often in hundreds of thousands or millions of hits, the time costs and the requirements for extra computing power are prohibitive.

The solution to the proximity conundrum 0550 is to use compression and to include position data within the list of occurrences of each term. The compression solution 0570 is implemented within the instant invention. All elements of the index structure for a token (word) are ultra-compressed so that positions data may be included. This makes it possible either to load the index structures for the selected terms into RAM or to stream them with only a single seek per term. This solution radically reduces computing time. For a four word specification, for example, "electric" AND ["auto" OR "vehicle" OR "car"] and a result list of 10,000 hits, there need be only four disk seeks. This is in stark contrast to the 10,004 disk seeks required (one for each word, one for each hit) using traditional proximity techniques.

FIG. 06 provides detail on the structure of the compression index ebook 0240. FIG. 06 lays out how the three primitives of search—tokens 0310, frequencies 0320, and positions 0330—are incorporated together with a few facilitating parameters into a single highly compressed structure that doubles as an index and an ebook. In the early prototypes, a single compression index ebook could comprise the equivalent of 50 megabytes of text, that is, a significant collection of books could make up one ebook. Switching from one ebook to another is from the user's viewpoint a trivial task. As technology advances, it is contemplated that a single compression index ebook could exceed 50 megabytes.

Compressed integers 0610 are used exhaustively in the structures of this patent application. Compressed integers are described in a patent application having Ser. No. 09/849,716. Compressed integers 0610 are non-negative integers expressed in one or more sequential bytes. Bytes are arranged in descending order from high to low value. In the first byte, the location of the first bit which is turned on determines the number of bytes. If the high order bit (the very first bit) is set, the compressed integer is shown in the remaining seven bits of that one byte (range 0 to 127). Bit pattern 01 at the beginning of the first byte means the value is in fourteen bits (remaining six bits of byte 1, the eight bits of byte 2) with range 128 to 16,383. Bit pattern 001 in lead-in to the first byte means a three byte integer in twenty-one bits (5+8+8 bits) with range 16,384 to 2,097,151. Bit pattern 0001 in lead-in to the first byte means a four byte integer in twenty-eight bits (4+8+8+8 bits) with range 2,097,152 to 268,435,455. There is no theoretical upper bound to compressed integers. Note that throughout the present invention, the use of four byte integers in many instances might be replaced by the use of eight byte integers in any setting in which implementations deal with values greater than four billion.

There are three limitations to the use of compressed integers: (a) they must be non-negative integers, (b) the programmer must know where in a byte stream a compressed integer starts, and (c) byte streams containing compressed integers can only be read in the forward direction. Trying to detect a compressed integer by reading backward in a stream is open to misinterpretation. A function to convert from an integer to a compressed integer, and a counterpart function to convert from a compressed integer to a normal integer each amount to little more than bit shifting. These functions therefore are very quick. Examples in the computer program listing appendix are named "fr_c_int.cpp" (from compressed integer) and "to_c_int.cpp"(to compressed integer). Compressed integers are useful for avoiding patches of null bytes that show up frequently in fixed length data. Disguised or encrypted compressed integers are less vulnerable to pattern detection. In the compression index ebook 0240, compressed integers contribute significantly to reducing file size.

FIG. 06 next deals with the first of the three primitives of search 0210, tokens 0310 0620. Any body of text may be separated into a stream of successive tokens. A token takes the form of a word, a string of punctuation characters, or a markup tag that contains no blanks. Note that markup tags that contain blanks are broken into multiple tokens.

Parsing rules 0623 based on the natural language of the text are required in order to discriminate between successive tokens. Here are examples of parsing rules established for English text in the preferred embodiment. (a) Words are deemed to be followed by a blank unless a punctuation string occurs instead. (b) A word may be alphabetic, alphanumeric, or numeric. (c) Hyphenated words are treated as single tokens—example, "front-loading". (d) An apostrophe may be embedded between two successive characters and be deemed part of the word—examples, "David's" or "Hallowe'en". (e) Word tokens with different capitalization patterns are treated as distinct tokens; for example "the", "The", and "THE" represent three tokens. (f) A numeric string may have a dollar sign prefix and intervening single commas and periods between pairs of digits. (g) A punctuation token contains every intervening non-alphanumeric character between two other non-punctuation tokens. (h) A punctuation token may contain zero, one, or multiple blanks. (i) Markup tag tokens that identify headings, paragraphs, and fields, and selected other markup tags are assigned special treatment; for example, they are kept out of the normal sort order of tokens and are assigned reserved numeric values.

In the body of the compression index ebook 0240, tokens are sorted 0626 in order of declining frequency. The token types are irrelevant to this sort; punctuation, markup tag, and word tokens are all together. The tokens are laid end to end, each with a flag byte preceding and a null byte following. The sequential position of each token within the accumulated collection of tokens is mapped to an implied numeric value. This is best explained by example; thorough detail is found in the header files included with the source code on the computer program listing appendix. Suppose there are eighteen reserved tokens, and these are assigned reserved values 0 through 17. Then the first token in the sorted collection (typically the word "the") is assigned a value 18, the next token the value 19, and so on through the thousands of distinct tokens in the target text.

The rationale for this atypical rank ordering of the tokens 0626 will become apparent below in the discussion of the auxiliary made-on-the-fly-when-needed compressed text file 0643.

Each token may be preceded by a flag byte 0629. One bit signals punctuation versus text. Another bit is set on if the token occurs within a markup tag, off if not within a tag. Yet another bit signals that the token is comprised by a 16 bit wide format. Another bit may indicate that both 16 bit and 8 bit representations follow, separated by a null. The byte preceding each token may accommodate up to eight such flags. Flags (if present) are used to increase speed of handling of the tokens during browse and search operations. They also may provide greater control to the user who might wish (for example) to restrict the search to terms that are not inside markup tags, lest common tag words like "align" and "left" show up in a text search when they have no bearing on the meaning of the text. The downside of including the flag byte is the slight increase in size of the compression index ebook 0240, one byte for each unique token.

FIG. 06 next deals with the second of the three primitives of search 0210, frequencies 0320 0630. Given an ordered list of the tokens 0620 comprising a body of text, knowledge is needed of the number of occurrences of each term. The frequency vector is surprisingly compact. The frequencies are laid out in descending order in the form of compressed integers. Here is the top part of a real list of tokens with frequencies: 25915 of "the", 21672 of comma-space, 16464 of "of", 15728 of period-space, 10575 of "and", 8736 of "to", 6577 of "in", 5365 of "is", 5256 of "a", 4124 of the line break tag, 3964 of "that". Notice the large declines between successive frequencies in the early part of the list. Further down, shorter jumps and occasional repetitions of frequencies appear. After experimentation, a decision was made with the prototype to represent actual frequencies down to 128, then switch to a count of tokens having each frequency. There are hence 127 counts to complete the list. In the same example, there were 3 of count 127, 1 of count 126, 4 of count 125, 6 of count 124, 5 of count 123, 7 of count 122, 3 of count 121, . . . down to 1030 of count 4, 1542 of count 3, 2870 of count 2, and 8245 of count 1. This pattern of frequency distributions is fairly common. Note that the frequencies of the 19,815 tokens in this text data could be represented in well under a thousand bytes of compressed integers laid end to end. This compression of the frequencies 0635 is possible only because the tokens were sorted in declining frequency order 0626.

FIG. 06 next deals with the third of the three primitives of search 0210, positions 0330, 0640. Positions are laid out, one after the other, starting with the most frequent token, with one position for each occurrence of that token (in the above example, 25915 positions of the word "the"), then with those of the second most frequent token (21672 positions of the punctuation token comma-space), then those of the third most frequent token, etc., on and on until the position of the (typically single) occurrence of the last and most infrequent token. Obviously, the accumulation of token positions constitutes a great deal of data. In the above cited example of text made up of 19815 distinct tokens, there were 456,825 positions for an average frequency of about 23.

Positions within a compressed text RAM file 0643, which is computationally equivalent to the full text used in the procedure 0130, are used to create a compression index ebook. Recall that tokens within the compression index ebook 0240 are stored in reducing frequency order 0626. This is done to assure that the most frequently occurring tokens are assigned the lowest numbers. Recall in the discussion of compressed integers 0610 that any number under 128 can be represented in a single byte. Words assigned numbers under 128 may easily account for more than half of all occurrences. In the above example 111 tokens account for 235,690 of the 456,825 positions, a total of 51.6%. Tokens that have values from 128 through 16,383 can be represented in a two byte compressed integer. If there are over 16,365 (16,383 minus 18) non-reserved tokens, three bytes are needed to represent each token that has a high number, but such tokens are virtually guaranteed to have very low frequency. In the same example, the last 3,449 tokens each occur only once, for a total of 0.75% of instances. The net effect of this rank ordering of tokens 0626 is to enable a very compact representation of the entire body of text, should the index be "inverted". Such a compressed text inversion of the index is precisely one of the auxiliary files that is built at startup in RAM 2070 or created as a server-ready file 1350, 1855. This compressed text 0643 is a crucial structure for displaying either browse content 1960 or search results 2440, 2450. The more compressed this rendition of the text, the more efficient the use and the larger the text collections that can be incorporated within a single compression index ebook 0240.

Let it be clear that the compressed text RAM file 0643 is not part of the compression index ebook 0240. Compressed text 0643 can be derived whenever needed from the primitives 0210 held in the compression index ebook 0240.

The compressed text RAM file 0643 is made up of a series of compressed integers 0610, one for each successive token in the original text. All positions point, not to the text itself, but to the compressed text 0643. The positions list consists of an uninterrupted vector of compressed integers, one for every position of each and every token. The first position for each token is expressed as the absolute number of bytes from the beginning of the compressed text 0643. Thus each position of an initial occurrence is unique and precise. To ensure even better compression of the positions data, it is only the first instance of each token that is absolute; the position of the second occurrence and of all following occurrences are relative to the preceding position. Example: The most common term typically is "the". Suppose it occurs for the first time 17 bytes from the beginning of the compressed text 0643. The next occurrence is very likely within 128 bytes, so the second position is recorded as a compressed integer one byte in length. So too for most successive RELATIVE positions of "the", positions can be rendered by a compressed integer that occupies one byte for each occurrence. In general, the high frequency tokens have very compact position lists, averaging hardly more than one byte per occurrence. For the low frequency occurrence tokens, many positions may have to be represented by compressed integers which may require three, four, or even five bytes. But these long representations are infrequent, so they do not harm the compression unduly.

By compiling the supplied sample source code and walking it in debug mode, persons of ordinary skill in the art can persuade themselves that this technique of compressing the positions 0646 is compact, absolutely precise, and extremely efficient. Commented out in the source code is an option to reproduce the original text in its entirety from the compressed text 0643. This code may be activated for testing purposes whenever any significant source code revisions are anticipated.

Parameters 0650 are not primitives. They are of two types, public and private. Public parameters 0653 in the prototype include the ebook title, version, creation date, expiry date, product number, distributor, welcome screen, alternate welcome, copyright message, and permission message. This information is helpful but not essential to the functioning of the compression index ebook. Public parameters 0653 are passed as open text at the beginning of the compression index ebook 0240. Here is a partial sample:

{Title} 37 Plays of Shakespeare
{Created} 1060961784=Fri Aug 15 11:36:24 2003
{Version} August 2003
{Ebook number} 100
{Distributor} Marpex Inc., Steubenville Ohio USA 43952

Each parameter occupies one line; each such line begins with a tag that identifies the parameter type. Every line ends with a line feed/end of line combination. The last public parameter 0653 is further followed by a null byte.

Private parameters 0656 in the prototype include the creation and expiry dates, a flag to restrict display to locations data only, sizes of all components within the compression index ebook 0240, and a few security controls. Private parameters 0656 follow immediately after the null byte that terminates the public parameters 0653. Private parameters 0656 are represented as compressed integers 0659, packed in binary form and subjected to some level of disguise and cyclic redundancy check controls to discourage attempts to reverse engineer and alter them. Technically, this information also is not essential to basic functioning of a compression index ebook. For example, all sizes could be calculated from the primitives that are present. The presence of this small quantity of non-primitive information is included to speed up browsing and searching in the compression index ebook.

All the above (tokens 0620, frequencies 0630, positions 0640, and parameters 0650) together in the forms described above constitute a compression index ebook. Since the full original version of the text is computationally equivalent to the compressed text 0643, the original text may be discarded 0660. Moreover, since compressed text 0643 can be derived from the tokens, positions, and frequencies, the compressed text too may discarded. What remains is an exhaustive, all-inclusive index of every token, suitable for deriving closeness-of-fit measures, and for reproducing on the fly any portion whatsoever of the original text for display on the screen as either browsable content or search results. These latter characteristics make the compression index fully functional as an ebook. Since the original text may include without limit any HTML, XML, or other markup tags, the compression index ebook can support all the accustomed features associated with the markup language—for example, bulleted lists, tables, navigation links, capacity to display separate image files, etc., etc. Samples may be viewed at www.Proximity-Search.com.

FIGS. 03 through 06 considered details of theoretical considerations 0110 listed in FIG. 02. Attention now passes to the first of the procedures to implement the instant invention.

FIG. 07 provides an overview of the five stages in the procedure 0120 to prepare target text for inclusion in the compression index ebook 0240. There is one figure for each of the stages. FIG. 08 examines selection of target text 0710. FIG. 09 shows how to ensure computer accessibility of the text 0720. FIG. 10 demonstrates factors in analyzing the text 0730. FIG. 11 shows how to preprocess text 0740. FIG. 12 provides a view of a program to assure text quality 0750.

FIG. 08 covers the first task of selecting target text 0710, that of identifying the documents 0810 to be indexed. These documents may start as fully tagged HTML or XML files, computer files from which text can be extracted, computer content which can be displayed on a screen for copying and pasting, or in worst case on paper suitable for scanning. Some judgment is in order as to what documents to include together for a single compression index ebook 0240. If they fall within at least a broad subject or interest category, that would be helpful, but not essential.

What quantity of text to include 0820? A compression index ebook may be as small as one wishes, or up to many megabytes. A useful rule of thumb is to keep the full size of the text that is indexed no larger than the amount of RAM that a user is likely to have free when the search and browse program is in use. This leads to current technical considerations 0830. The compression index ebook 0240 is generally only 33% to 40% of the size of the text, but the full set of RAM files generated approaches the size of the original text. As of early 2004, low end new computers commonly have 128 to 512 megabytes. Older computers may have more or less. For this point in time, 50 megabytes might be a reasonable upper limit guideline. This size recommendation will grow as the RAM capacity of computers increases. Note that graphic content, as in the case of Internet pages, are maintained as separate image files; therefore their size does not enter into the calculations.

An example 0840 of text suitable for the compression index ebook 0240 might be one patent application, or alternatively a group of patent applications that fall within a range of interest. A reasonable assumption is that the text portion of current patent applications might average 100 kilobytes. Hence grouping together 500 patent applications in one compression index ebook 0240 is feasible.

FIG. 09 presents a quick view of considerations to ensure computer accessibility of the text 0720. Is the text content directly machine readable 0910? In the worst case, it is on paper. Scanning paper documents 0920 is fraught with quality issues, the most vexing of which is the tendency of text recognition software to render the em dash and en dash as a hyphen, loading the content with non-existent seemingly hyphenated words. Fortunately, scanning is unnecessary for most newer accumulations of text which are generally created in the first instance with word processors. A second means is to assemble text which is particular to software programs with obscure formats; the drawback is that it has to be shown one screen or file at a time, copied, then pasted 0930 into a word processor file from which text can be readily extracted.

If the material is computer accessible, one remaining consideration is whether the text is plain text 0940 or encrypted. In the latter case, it needs to be decrypted 0950.

FIG. 10 presumes fully computer-accessible text, ready for the procedure 0730 of analyzing text. This analysis can be broken down into nine sets of factors related to: computer file type 1010, natural language used 1020, text quality 1030, markup 1040, formatting (tables, lists, etc.) 1050, graphic elements 1060, hierarchies of headings 1070, domains and units of search 1080, and fielded text 1090. The lists below are not necessarily all the issues, but they illustrate the kinds of concerns. Note that, despite the length of the lists of factors below, analysis may nonetheless be quick.

Factors related to computer file type 1010 focus mainly on the ease of conversion of the text content and the ability to recognize key elements such as headings and paragraph beginnings. Does the file have to be opened and saved as a text version, and if so what information is lost that might otherwise be useful for tagging? Does a text extractor program exist for this file type? How good is it at recognizing formatting elements? The better the quality of text extraction and format recognition, and the more these tasks can be automated, the easier it is to produce quickly a high quality compression index ebook 0240.

Factors related to natural language 1020 include (a) the use of eight bit standard ASCII characters versus the presence of 16 bit wide character formats; (b) the extent to which the text uses high-bit-set bytes for accents and special symbols (for example, the copyright symbol); (c) whether writing in the language runs left to right, right to left (as in Hebrew), or vertically; (d) allowable punctuation characters within words (for example, hyphens and apostrophes in English words, symbols within numeric terms).

Factors related to text quality 1030 relate primarily to spelling. Spell checkers do not catch inappropriate choices of correctly spelled words. Has the text been subjected to competent human review in its present form? Is the text meaningful as written? Are words inappropriately hyphenated? The better the quality of the text, the better the quality of search in that text when it is in compression index ebook 0240 form. It is not guaranteed that the search interface will guess effectively at misspelled terms; it is better to have the text correct to start with.

Factors related to markup 1040 include: (a) Are the essential markup symbols (those that distinguish the boundaries of domains 0535) present? (b) Are the markup symbols correct? (c) Are there extraneous markup symbols that contribute little except bulk to the end result? (d) Are markup symbols balanced, in the sense that "end-of" matching tags are present for tags that take them? (e) Are the markup symbols relevant to search characteristics of the end result? (f) Are there editorial intrusions within terms? For example, presence of inserted square brackets might break up a search term. "[C]onfess" results in two searchable terms: "C" and "onfess". Search on the word "Confess" would miss this occurrence. (g) Are there codes (for example, HTML ampersand codes) that are better reduced to normal representation (hyphens, quotation marks, apostrophes, etc.)?

Factors related to formatting 1050 include: (a) Are bulleted lists and tables present within the text? (b) Are they correctly marked up per the rules of the markup language? (c) Can tables fit within conventional display widths?

Factors related to graphic elements 1060 include: (a) Are there tags that point to companion images? (b) Are the image files present? (c) Are there logistical problems in assuring that graphic files will be located in the expected directories if the compression index ebook is distributed? (d) Are the graphics overwhelming in size? (e) Do the graphics contribute meaningfully to the result? (f) Is text content of graphics included within the same domain so that it will show up in a search?

Factors related to hierarchies of headings 1070 include: (a) Is the minimum requirement—a single first level heading—present? This might be the URL if the input is a web page, a title if a book, etc. (b) Is there information present that will permit the preparation software automatically to recognize divisions between domains 0535 of meaning?

Factors related to domains and units of search 1080 include: (a) If markup tags 1040 are not present, are there alternative ways of recognizing headings and paragraph units? (b) Is there content that appears outside of paragraphs or other units of meaning?

Factors related to fielded text 1090: (a) Are fields present (as for example in bibliographic databases)? (b) Are fields uniformly distinguished throughout the data set? (c) Are divisions between records clearly recognizable?

FIG. 11 examines the preprocessing of text 0740: the goals 1110, minimum requirements 1120, issues in translating from word processing codes 1130, extracting text 1140, recognizing formats 1150, inserting format tags 1160, inserting heading tags 1170, inserting search unit descriptors 1180, and balancing the tags 1190. All techniques within FIG. 11 represent skills that are widely held by persons of ordinary skill in the art. Many different programs might be written by a variety of software engineers. By whatever means text is preprocessed, however, the result must pass the quality assurance checks considered later in FIG. 12.

The goals of preprocessing 1110 are: (a) to recognize and extract the text content in the correct sequence; (b) to insert a minimum level of markup tags (HTML, XML, or other) sufficient to identify and to structure the document for convenient browsing and search; (c) to divide text into domains in a reasonable way so that the words at the end of one domain need not be considered "near" the first words of the next domain; (d) to achieve a level of formatting that facilitates the reader's attempts to derive meaning from the content; (e) to point if necessary to the original document.

Goals may differ considerably, depending on the nature of the source document(s) and on the needs of the person searching in the resulting compression index ebook 0240. For example, suppose a publisher wishes to add value to a textbook published on paper. An electronic edition mighty warrant precise recognition of all headings and insertion of page and line numbers to identify the beginning of each paragraph. At the other end of the spectrum, a collection of Internet pages might be preprocessed only to the extent of inserting one heading (the appropriate Uniform Resource Locator) at the beginning of each page to identify that page. There is a tradeoff in quality of search versus speed of preparation. In general, the search and browse value of the compression index ebook is improved to the extent that the text is marked with headings, domain identifiers, and formatting. However, the preprocessing tasks may be largely automated, and therefore completed at low cost. Preprocessing amounts to little more than customized text processing, a long established art within the field of computational linguistics. This patent application poses nothing novel under FIG. 11; it simply purports to guide the preprocessing task toward the above stated goals 1110.

The absolute minimum requirement 1120 is that each document be free of non-printable matter such as binary codes, and that it have a single header marked up at its beginning. Note that HTML, XML, and other markup files are entirely free of non-printable characters, so the minimum requirements are not onerous. Certain additions beyond the minimum are easy to add. If there is a hierarchy of headings that contribute meaning to search within the document, it is highly desirable to insert markup tags that identify each heading. It is also better if paired markup tags are balanced. For example each paragraph tag should be matched by a corresponding end paragraph tag. The prototype embodiment was set up to accept either lightly tagged text files or alternatively HTML files that matched the minimum requirements and had balanced tags.

Translation from word processing codes 1130 becomes an issue in cases where the input document is in a word processing file format. At a minimum, the blocking, formatting, and other codes must be removed. Better yet, they should be replaced by appropriate tags. Example: One can readily observe in a WordPerfect file that byte value hexadecimal 0×80 (128) is used to represent a blank in text. Preprocessing software must make that substitution, and many other such substitutions. One difficulty is that some of common word processing file formats are proprietary and available documentation is scanty. There are commercial firms that offer text extraction from over 250 formats—everything from Adobe Acrobat (R) to Microsoft Word (R). In addition, there is a growing body of format conversion software in the public domain with source code available. Conversion need not be to text. Software that converts straight to HTML and XML is also becoming common; the quality varies considerably.

Consider an alternative approach to dealing with word processing files. Most word processors permit conversion of one file at a time from formatted versions to straight text. If one has a quantity of rich text (.rtf) files or Microsoft Word (.doc) files, for example, it is possible to open a file, then save it as text. Advantages: It works, and it costs nothing extra to the person who already has that word processing program. The disadvantages: All formatting is lost in the process, and one can only process one file at a time. Insertion of any header tags is best done before saving the file as text. That way, the headings show more readily.

Whatever the form of the input, the various steps in preprocessing are generally concurrent. They are separated here only for convenience of understanding.

Text extraction 1140 is no task at all if the input is a standard text file already comprised of printable ASCII characters. Text extraction from other formats is more involved, but still readily within the capacity of one skilled in the basics of text processing.

Recognition of formats 1150 is also a function of source file type. Those that help in delimiting domains 0535 are the most helpful. Many other formats may be safely ignored. The decisions on which to ignore and which to translate into markup tags depend on the needs of searchers, and the extent to which detail tagging might assist comprehension of search results when displayed.

The most typical format tags to insert 1160 include bold, italics, unordered lists, and tables.

It is not always possible to automate the recognition of heading tags 1170; they may need to be inserted through a word processor. The problem at least on web pages is that use of the HTML heading tags (1 through 6) take away control of the size and format of the display. Therefore many HTML pages have headings between paragraph and paragraph end tags, sometimes in capital letters, other times in bold or italics. A single line paragraph entirely in bold is likely to be a heading; nonetheless, human review is probably necessary to judge what level of heading. It is also desirable to watch the sequence of headings, that there are no jumps from high level headings to headings that are two or more levels lower; such jumps are rare in well written content. Manual review of headings is usually a quick task since headings tend to make up a very small portion of a total text file.

Search unit descriptors 1180 such as paragraph headings are not essential, but they are helpful to the searcher. These descriptors appear in short lists of "hits" or records found in a search. Appropriate descriptors may be simple sequence numbers within a group of headings, page and possibly starting line numbers within a book, chronological dates, etc. This process can be automated if paragraph or record numbers or search units are readily recognized.

Balancing the markup tags 1190 is helpful. If this practice is followed, and if all paired tags appear in last-in-first-out (LIFO) order, then the end tags can be reduced to a standardized single byte in the compressed text 0643 version. Note in the source code in the computer program listing appendix the presence of an "OFF_STACK" token in the SrFind.h header file. See the discussion of 1230 shortly below.

FIG. 12 presents major considerations in assuring text quality 0750 in preparation to create the compression index ebook 0240. The quality assurance stage best takes the form of a separate program; this program should be made readily available in executable and source code forms to all interested persons. One such program is included in the computer program listing appendix. The first task of such a program should be to report non-printable characters 1210.

To avoid problems in recognition of markup tags, a program to assure text quality 0750 should report inappropriate angle brackets or orphan greater-than and less-than symbols 1220.

A program to assure text quality 0750 should also report failures in nesting order of tag pairs 1230. Here is an example of LIFO order of tags: paragraph--bold--end bold--italics—bold--end bold--end italics--unordered list--list item--end list item--list item--end list item--end unordered list--end paragraph. The currently applicable tags can be represented on a stack. An end tag can occur only when the latest beginning tag of the same type is the top tag on the stack. If an end italics tag is the next tag after a beginning bold tag, this order fails any last-in-first-out requirement.

A program to assure text quality 0750 should also report domain issues 1240, that is, sections of text in which there is no clear delineation between units of search 1080 0535.

Failure reports concerning any of the above 1210 1220 1230 1240 should bring to a stop any automated sequence of programs to carry out the procedure 0130 to create the compression index ebook 0240. Apart from quality failures, one other use of a program to assure quality 0750 is to report statistics 1250 such as count of each level of heading, count of search units, count of the various markup tags, etc.

FIG. 13 presents an overview of five stages in the creation 0130 of the compression index ebook 0240. These stages are to accumulate parameters and token frequencies 1310 (FIG. 14), to build the token list and frequencies 1320 (FIG. 15), to accumulate positions data 1330 (FIG. 16), to combine above into one compression index ebook 1340 (FIG. 17), and to build optional server-ready files 1350 (FIG. 18).

FIG. 14 describes the first of five computer programs that together create 0130 the compression index ebook 0240. This first program accumulates parameters and token frequencies 1310 on a single pass through all the files of lightly marked up text that together comprise the input for the new compression index ebook 0240.

Examples of parsing rules 0623 were considered with FIG. 06. Parsing rules 1410 are based on the natural language of the text, and tend to be stable across large and disparate quantities of text in any one language. It may, however, be appropriate to substitute alternative rules for special purpose sets of text data. Custom written code may follow the method and logic of the source code example included in the computer program listing appendix.

As each token 0310 is recognized, record must be kept of which tokens were found inside markup tags 1420. For example, the word "right" has one set of meanings in ordinary text; it has one meaning only when it is found inside a markup tag, and that has nothing to do with the meaning of adjacent text. Therefore tokens that appear both inside and outside of markup tags are treated as distinct and different tokens. This distinction is shown later as one of the bits within the flag byte 0629 that precedes each token 0620 in the compression index ebook 0240 structure.

Recall that punctuation tokens 0310 consist of all non-alphabetic non-numeric characters in a string that separates two other tokens, where those other tokens are either tag tokens or word tokens. This was discussed under parsing rules 0623 above. The program to accumulate parameters and token frequencies 1310 must distinguish 1430 between punctuation tokens and other tokens based on the parsing rules set above 1410. The status of "punctuation token" is marked by a bit within the flag byte 0629 that precedes each token 0620.

If text quality has been assured as in FIG. 12, then delimiters that distinguish headings, records, and (where applicable) fields 1440 are already in the text. These become the base for assigning domains 0535 within the incoming text.

The primary function of the current program 1310 is to accumulate frequencies of all elements 1450—tokens of all types and parameters—and to store them in a form suitable for use by the next program (to build token list and frequencies 1320) in the series of programs in the procedure 0130 to create the compression index ebook 0240 (FIG. 13).

FIG. 15 presents the sequence of steps to build the token list and frequencies (1320) which will become part of the compression index ebook 0240. This is a separate program that may follow on automatically after the program to accumulate parameters and token frequencies (1310).

The first step 1510 is to sort all tokens 0310 in order of declining frequency. The rationale for this unusual sequence was discussed earlier under rank ordering 0626 the tokens used.

The next step 1520 is to create a temporary parameters file to facilitate passing parameters between successive stages in the procedure 0130 to create the compression index ebook 0240.

The third step 1530 in this program 1320 is to create the token list, that is, all the tokens 0310 laid out in declining frequency sequence with a flag byte 0629 preceding and a null byte following. All information required for the flag bits was gathered during the process to accumulate parameters and token frequencies 1310. This array of tokens may be written out as a temporary file.

The fourth and last step 1540 in this program 1320 is to compress and output the frequencies of the tokens. See compress the frequencies 0635.

FIG. 16 provides overview of a program to accumulate positions data (1330). This is an exhaustive treatment of every token 0310 throughout the target text, identifying what its position (offset from the beginning) would be in a compressed text RAM file.

The first step 1610 is to set RAM to accumulate positions data 0640. A single block of random access memory is reserved, with four bytes for each position of each token 0310. The size is calculated by summing all the token frequencies 1540 which were output in a temporary file earlier. This is a simple computation; one has to watch for the changeover from frequencies to counts of tokens sharing a frequency 0630 0635. In addition, a vector of offsets is prepared to indicate the first position space reserved for each token, still in declining frequency order. Return to the earlier example 0630 0635 in which the top part of a real list of tokens with frequencies were as follow: 25915 of "the", 21672 of comma-space, 16464 of "of", 15728 of period-space, 10575 of "and", 8736 of "to", 6577 of "in", 5365 of "is", 5256 of "a", 4124 of the line break tag, 3964 of "that". The first 25915 times 4 equals 103,660 bytes are set aside for occurrences of "the" and the beginning offset of this block within the "positions" RAM block 0640 is zero. The next block for token comma-space starts at 103,660, and has length 21672 time 4 equals 86,688. The third block for token "of" has an offset of 190,348 (103,660 plus 86,688) and has length 16464 times 4 equals 65,856 bytes. And so forth. There will be one offset for each token, and the last token (most likely) with frequency one will use exactly the last four bytes of the "positions" RAM block 0640.

Earlier, FIG. 14 was used to demonstrate the setting of parsing rules 1410 and the parsing process. The current step 1620 in the program to accumulate positions data 1330 is to parse the entire text data set again. This time, instead of simply counting occurrences, the position of each and every token is recorded in the positions RAM block. Note that every token has a numeric value, either by virtue of being a known tag with a reserved value, or by virtue of its location within the series of tokens arranged in declining frequency order. The very first token has position zero. Its width is one byte provided its value is under 128, two bytes if from 128 to 16383, three bytes if from 16384 to 2097151, etc., etc., per the discussion on compressed integers 0610. A pointer is maintained to the first available position not yet assigned in the compressed text version (whether or not a compressed text RAM file 0643 is actually generated during this program). A vector with four bytes for each token is also maintained to track the quantity of each token encountered so far in this round of parsing. Each new position for any given token is inserted at the starting point for that token PLUS four times the number of entries of that token encountered to date. The vector of tokens encountered to date of course starts with all values set to zero. By the time parsing is finished, the vector contains the frequencies of all tokens in declining sequence, and the positions RAM file is precisely filled. (Note the mandatory requirement that the text files are not modified in any way whatsoever between the two parsing runs—counting the first time as in FIG. 14, and now accumulating positions 1620.)

It is recommended that the compressed RAM file 0643 mentioned in the preceding paragraph 1620 be created for test purposes 1630 at least during construction and early use of the program, and whenever changes are made in the logic. This is an option. Its value is to permit regeneration of the entire incoming text; the new copy may be compared to the actual text used. There should be byte-by-byte equivalence of the two versions.

The last step 1640 in the program to accumulate positions data 1330 is to compress and output the positions data 0640. This is a very straight forward implementation of the methodology discussed under "compress the positions 0646". It is simple because the positions are already in the order needed. All positions start as absolute. Switching to relative positions within the range of positions for one token is also simple.

FIG. 17 presents the fourth program in the procedure 0130 to create the compression index ebook 0240. This program combines tokens, frequencies, positions, parameters into one file 1340. The first step 1710 is to output public parameters 0653 as plain text at the beginning of the file. The next step 1720 is to output the private parameters 0656 which are compressed as described 0659. An optional step 1730 is to apply security algorithm(s) to discourage reverse engineering and inappropriate access to parameters or content. In the last step 1740 the tokens, frequencies, and positions vectors might be serially appended to complete the file; alternatively, depending on security needs, other techniques might be used to integrate the tokens, frequencies, and positions components. By whatever means, the end result is one compression index ebook 0240.

Turning now to FIG. 18, when a compression index ebook is opened for browsing and searching on a personal computer, a multiplicity of RAM files is created; these files remain in place until either the program or the ebook is closed. While all the files can be generated quickly, there is some overhead in creating files (such as the compressed text RAM file 0643) on the fly. Server based browse and search would require unpacking the compression index ebook 0240 and creating temporary files every time the user clicks on the Submit button or its equivalent. While the overhead is slight, it becomes significant if many persons are using the program simultaneously. Therefore FIG. 18 indicates the steps in building optional server-ready files 1350. These files can be laid end to end, with a vector at the end to show the size of each component. Apart from the fact that here the RAM files are written to disk for storage rather than retained in RAM, the procedure here is identical with steps 2050, 2060, and 2070 for opening the compression index ebook 0240 on a personal computer.

The first step 1805 is to remove whatever security wrap 1730 1740 was applied to the compression index ebook 0240. If no security was applied, the parameters may be read to determine size requirements, dynamic memory may be allocated, and the various components of the compression index ebook 0240 may be read without manipulation into RAM. If there is high sensitivity over the content of the compression index ebooks 0240 involved, be aware that the server-ready files are readily open to reverse engineering. Therefore there should be caution in distributing copies of the server-ready files. It may be sufficient to place them on the one server or cluster of servers in one safe location.

Step 1810 is to set up an output file. This binary output file will receive each of the twelve server-ready files below, laid end to end, followed by a vector of twelve integers giving the lengths of each of the components. Set aside space in memory to record these twelve lengths.

Step 1815 is to extract, decrypt if necessary, and decompress the private parameters 0656. The private parameters 0656 are needed right away since they provide the sizes of components of the compression index ebook 0240. The private parameters 0656 appear immediately after the null byte that terminates the public parameters 0653 in the compression index ebook 0240.

Step 1820 is to output the public parameters 0653 in their plain text form with the terminal null byte. This set of bytes will constitute the first of the twelve components written end to end to the output file opened in step 1810.

Step 1825 is to output the private parameters 0656 in their unpacked open form (each integer as 4 binary bytes, etc.)

Step 1830 is to extract the token list 1320 1530 and output it to the output file.

Token frequencies 0635 are stored in a highly compressed form within the compression index ebook 0240. Step 1835 is to expand the frequencies into one four byte integer for each token, and to output the result.

Token positions 0646 are stored in a highly compressed form within the compression index ebook 0240. Step 1840 is to expand the positions into one four byte integer for each occurrence of each token, and to output the result.

Step 1845 is to create and output a vector of four byte integer pointers, one for the position corresponding to the first occurrence of each token.

Step 1850 is to create and output a vector of four byte integer pointers, one for the flag byte at the beginning of each token in the token list 1320 1530.

Step 1855 is to build and output the compressed version of the text 0643. The size of this version is normally passed from program to program in the procedure 0130 to create the compression index ebook 0240. Allocate this amount of space. Next, proceed through all of the tokens one at a time, first expressing its value as a compressed integer 0610, and then copying that compressed integer starting at each of the positions for that token within the space allocated for compressed text. Append the result to the output file 1810.

Step 1860 is to build and output the headings tree. The headings tree contains one printable ASCII line for each heading in the data set. Recall that headings (as well as paragraph beginnings and record identifiers) are associated with the beginnings of domains 0535, and that domains are numbered sequentially upward. In the prototype embodiment, HTML tags were used with heading tags H1 through H6. A sample headings tree is included in the computer program listing appendix in a file named headings.txt. Note the format . . . a six byte integer for the domain number, an eight byte space, blank in most cases, but with the term "PARENT-"preceding instances of headings that have sub-headings, then the tag, then the text of the heading. This list is used later to facilitate display 1930, expansion, and collapse 1940 of the browse list within the procedure 0140 to browse in the compression index ebook 0240, as shown in FIG. 19.

Step 1865 is to build and output the domains list. The domains list contains one printable ASCII line for each domain 0535 in the data set. In the prototype embodiment, HTML tags were used with paragraph tags in addition to heading tags H1 through H6. A sample domains list is included in the computer program listing appendix in a file named domains.txt. Note the format . . . an array of ten fixed length elements separated by blanks. First there is a four byte integer for the domain number, then the tag that begins the domain, a label "Bgn", an integer indicating the offset from the beginning of the compressed text file 0643 1855, a label "End", an integer indicating the offset of the following domain (i.e., one byte past the end of the current domain), the label "Dad", the number of the domain which is the parent of the current domain, the heading "Tx", and the number of bytes in the compressed integer version of the heading or domain descriptor. This list is used extensively in the procedure 0150 to search in the compression index ebook 0240, as shown in FIG. 21. Note that a "parent" is the next senior heading to a paragraph, heading, or other unit of search. See the discussion of domains 0535.

Step 1870 is to build and output a quick startup display for use on servers. This HTML (or XML or other) file substitutes for the dynamic file that is shown when the user opts for the procedure 0140 to browse in the compression index ebook 0240. As a rule of thumb, this tree shows only first level headings, unless there are fewer that four such occurrences, in which case the list is expanded to show the first and second level headings. This file can be displayed by a browser, and contains links to browse locations, icons for expanding or shrinking each portion of the tree, and an icon for each entry to request selection of the beginning of that portion for display on the screen, as shown in FIG. 19.

The last step 1875 in building optional server-ready files 1350 is to output component lengths. Each length will be output as a four byte binary integer. Since there are twelve components listed above, 48 bytes are required.

FIG. 19 presents the procedure 0140 to browse in the compression index ebook 0240. The browse capability is the reason for using the word "ebook" within the term "compression index ebook". Browsing enables the user to navigate through the expandable table of contents and to display on the screen full text accompanied by all of the graphic and formatting capabilities that are commonly available through Internet browsers.

The first step 1910 is to prepare and to load memory. Since there are decision points within step 1910, and since step 1910 is identical to an equally essential first step 2110 in the procedure 0150 to search, full details of steps 1910/2110 are shown in connection with FIG. 20.

Decision point 1920 is whether browse is enabled. An e-index is equivalent to an ebook without browsing and without text display. An e-index helps the user to find content quickly in a printed volume such as a text book or a reference work. Publishers may choose to issue e-indexes to add value to a printed work by enabling all the features of proximity search. One of the private parameters 0656 is a switch set to disable or enable the browse procedure. If the browse feature is not enabled, the next logical step is 1990.

If browse is enabled and has been requested by the user, the next step is to display the headings tree discussed in step 1860. In server-based operations, the first display of the headings tree is drawn directly from the file created in step 1870.

In subsequent server operations and all client operations, the display is created as dynamic HTML in the prototype embodiment. The objective is to provide a preliminary table of contents of the ebook, in which the user may drill down and/or navigate in order to select an area of interest for browsing.

The table of contents 1930 drawn from the headings tree 1860 is expandable. Step 1940 is to expand or shrink headings until the user wishes to select a specific element for browsing.

Step 1950 requires the user to select a heading (in reality, a domain within the heading tree).

Step 1960 is to reconstitute the selected domain 1950 0535, and to display its content on the screen. In the prototype embodiment, this output is dynamic HTML. The domains list 1865 provides the starting and ending point of the relevant domain. The method is to enter the compressed text RAM file 0643 at the beginning point, first for successive levels of parent headings, then for the domain itself. In each case, decompress successive integers, look them up through the token pointers 1850, extract the token from the token list 1320 1830, and write to the screen. This process is repeated until the end of the text portion of each heading, then the end of the domain itself is reached. Since the content may be any combination of text, punctuation, and tags, full dynamic HTML results. If image files are called and are in the expected location, they will show. If tables or lists are included, they are automatically generated from the tagged text that is implicit in the compressed text RAM file 0643. A few navigation links may be included to improve usability during browse.

Step 1970 enables the user to browse sequentially forward or back through the content. This amounts to selection of a new domain to browse. The behind-the-scenes implementation is then identical to that in step 1960.

Step 1980 enables the user to navigate to links simply by clicking. This applies whether the link is one created by the browse software or alternately if the link is embedded in the original text. The display area is (whether client or server based) a browser-operated web page, and all the normal browser procedures apply.

Step 1990 applies only if the ebook is found in decision step 1920 to be actually an e-index. In this case, a welcome page may be drawn either from a static file or created on the fly from the content of a "{Welcome}" segment within the public parameters 0653 of a compression index ebook. The title page (and, for that matter, all pages) include an invitation to search 0150.

FIG. 20 presents the behind-the-scenes steps that are followed when the compression index ebook 0240 is opened. The process depends on whether an ebook is already selected (decision point 2010). Go to step 2020 if none is selected, otherwise proceed to step 2030.

Step 2020 looks to the user to select the compression index ebook 0240 from among those available either on the server or the client (personal) computer. In the client prototype, a standard Windows function was used to select a single .pse compression index ebook (or .psx for an e-index) anywhere on the personal computer. For server operations, a list of available compression index ebooks 0240 must be presented in selectable fashion within web pages displayed through the user's Internet browser.

Decision point 2030 is invisible to the user; it amounts to a check whether the software is server based or not. The logic depends on how this decision point was reached. (a) If current operation is not server based, and if an ebook was already selected 2010, then the logic departs FIG. 20 and returns to the sending point, which was 1910 for browsing or 2110 for searching. (b) If current operation IS server based, then the next logical step is 2040, to load server files into RAM. If current operation IS NOT server based, step 2050 comes next.

Step 2040 is to load server files directly into RAM. These are the files that were built in step 1350 and described in detail in FIG. 18. Recall that the sizes of the twelve components are listed in 48 binary bytes 1875 at the end of the file 1810, and that the twelve components are laid end to end in that file. After finding the total length, positioning 48 bytes before the end, and reading in the twelve component lengths, position back to the beginning of the file. One at a time, allocate RAM space for a component and read its content into RAM. After all twelve components are in place, close the collection 1810 of server-ready files.

In cases in which the collection of server-ready files 1810 is not available, the steps of FIG. 18 are almost exactly repeated. The difference is that the twelve components are placed in RAM and not written out to a file. The first such step 2050 is to remove any security wrap from the compression index ebook, exactly as in step 1805.

Step 2060 is nearly identical to the actions in steps 1815 through 1840. In these, data (private parameters 1815, public parameters 1820, the tokens list 1830, frequencies 1835, and positions 1840) are derived from the compression index ebook 0240. Contents are placed in RAM and not written out to a file.

Step 2070 is nearly identical to the actions in steps 1845 through 1865 in which auxiliary files are created and placed in RAM. These auxiliary files include pointers to positions 1845, pointers to tokens 1850, compressed text 1855, headings tree 1860, and domains list 1865.

FIG. 21 presents the procedure 0150 to search in the compression index ebook 0240. The first step 2110 is to prepare and to load memory. Since there are decision points within step 2110, and since step 2110 is identical to an equally essential first step 1910 in the procedure 0140 to browse, full details of steps 1910/2110 are shown in connection with FIG. 20.

In step 2115 the user specifies a search. Since there is a multiplicity of factors involved in specifying a search, the detail of this process is treated separately in FIG. 22.

Decision point 2120 is reached between one and ten times; it checks whether there is yet another set in a search specification. A set specifies one Boolean rule (AND, OR) 2240 to be applied across a single group of from one to fifteen searchable terms 2220 with one set of word controls 2230 (whether or not matched case; partial words versus full words; whether or not exact phrase; maximum distance between terms). A person of ordinary skill in the art will find the source code in the computer program listing appendix very helpful, since it provides commented documentation in detail. The starting point is a function named CallSearchCode.cpp.

Step 2122 involves a search across the token list 1320 1530 for each of the one to fifteen specified terms 2220 in the set. Within a single compression index ebook the token list is entirely in RAM and small enough that hash tables or other sub-indexing probably add more overhead than is justified to find each term quickly. The requirements rematching case and whether whole or partial terms must be taken into account in step 2122.

Step 2124 is to winnow the set for missing terms. For each term that is found, the corresponding value 0626 of that token is noted. Suppose, however, a term was not found in step 2122. If the Boolean operator for this set is AND, the AND logic automatically fails with the absence of any one term. If there is only one search term in the set and that term is not in the token list, the set also fails. If there are multiple terms and none of the terms are found, the set also fails. Sets with multiple good terms and one or more missing terms continue to be valid only if the remaining terms are joined through a Boolean OR rule. If the resulting set of terms is empty, skip steps 2126 and 2128 for this set.

Step 2126 is to gather the position set for each term. This is a simple lookup in the pointers to tokens 1850 and the frequencies 1835.

Step 2128 is skipped if there is one or zero terms in the set. Otherwise step 2128 is to apply the Boolean rule 2240 within the set. Review the computer program listing appendix source code function CallSearchCode.cpp for detail. The OR logic is simply to merge the two to fifteen lists of positions into a temporary RAM vector; see the function "MergeIntLists.cpp. The AND logic must take into account the proximity requirement ("within_words"), and amounts to a narrowing of the list. See the functions ANDWithin.cpp and EvaluateProximity.cpp. Note that the output from a Boolean AND operation is an ascending list of domain numbers, rather than positions within the overall compressed text 1855.

Decision point 2130 concerns whether there are multiple groups that the user specified in step 2115. This is best described by example. Suppose that there are sets A through E, where each set is the result of a simple search. Suppose further that the specification is of the form ((A OR B) OR (C AND D)) AND NOT (E)). The combination (A OR B) constitute a group, as does (C AND D). Where there are multiple groups or stand-alone sets such as (G), the process passes to step 2133.

Step 2133 applies Boolean logic within any groups of two or more sets. Let F=the result of (A OR B); F is empty only if A and B are both empty. The result G of group (C AND D) fails if either C or D is empty, since it uses the Boolean AND. Each group has now been reduced to a single set. The question may be reformulated as F OR G AND NOT E.

Step 2136 is to winnow for empty groups. The process here is very much like that in step 2124. Suppose G, the result of (C AND D) proved to be empty. G is winnowed out, and the reformulation becomes F AND NOT E. Note that, had there been AND operations throughout between the groups, any one empty group would produce an empty result set.

Step 2139 is to apply Boolean logic across the results of all groups. The result is one single set.

Decision point 2150 is an inquiry into whether the results, for whatever reason, are empty. If this proves true, step 2155 is to report failure to the user to find any results from the search specification.

Earlier, FIG. 05 presented factors to take into account in ranking results by relevance to meaning. Since there are multiple issues, the detail of step 2160 is presented in FIG. 23.

Step 2170 is to display results of a search. Since this is a multistage process, the detail of step 2170 is presented in FIG. 24.

FIG. 22 outlines the process by which the user specifies a search through the compression index ebook 0240. Many factors may be set to default values that are retained if they are not changed by the person searching.

Step 2210 may involve only one action—(a) below—on the part of the user; the remaining items may be set by default. The minimum requirements for specification consist of (a) one word or part word,
(b) a selection, typically by default, among "All the words" (Boolean AND within the set), "Any words" (Boolean OR within the set), and "Exact phrase" (Boolean AND with whole words, zero waste words, and word order);
(c) "Whole words" requirement, defaulting to either off or on;
(d) "Match case" requirement, defaulting to either off or on; and (e) "Within_words", defaulting in the prototype embodiment to within 25 words.

The selection of Boolean operation is irrelevant if there is only one term in the list of tokens to be requested. The proximity requirement "Within_words" is irrelevant if there is only one term or if the Boolean OR applies. The minimum specification is completed when the user selects the "Go find" button.

In the prototype embodiment, step 2220 looks to the person searching to input search terms, from one to fifteen words or part words in each of one to ten sets.

Step 2230 requires either the user or the program by default to set word controls for each set. One word control option is "Whole words" versus partial words. A second control is "Match case" (example "The" and no other form) versus openness to all cases ("The", "the", "THE", etc.). A third control is a proximity requirement, that all terms in an "All the words"("AND") operation be within a certain number of words. The selection of "Exact phrase" also affects word control, since it implicitly requires whole words only, in the order specified, with no intervening waste words.

Within each of one to ten sets, step 2240 requires a user-selected or default choice among "All the words" (AND), "Any words" (OR), and "Exact phrase" (an implicit ordered AND).

Decision point 2250 depends on whether the user has input one set or multiple sets. Think of single sets as specifications each for an individual basic search. If there are two or more sets, the logic passes to step 2253, otherwise it jumps ahead to step 2260.

Step 2253 permits the user to arrange multiple sets into groups, as in the example in step 2130: ((A OR B) OR (C AND D)) AND NOT (E)). How elaborate these groups may be depends on the user interface. If SQL Standard Query Language is used, the arrangement may be elaborate indeed.

Within any such group 2253 of sets, step 2256 requires selection of a Boolean rule within that group. Step 2259 requires selection of a Boolean rule across groups to be joined in some relationship. Boolean operations within and among groups in the prototype embodiment were controlled through selection of an "Expand search" ("Alternatively search for . . . ", a Boolean OR) or a "Refine search" option which required further selection among "Result must include"(Boolean AND), "Include if possible" (Boolean AND that serves only to raise relevance score), and "Exclude" (Boolean AND NOT).

Step 2260 permits the user to specify a range, that is, limit search to portions only of the compression index ebook 0240. For example, someone searching the 37 plays of Shakespeare in a single ebook might elect to search only "The Merchant of Venice" and "Othello". This is carried out through a tree display very similar to the browse list, driven by a list of Boolean flags, one per domain, behind the scenes. In the prototype embodiment this field was not much used, since searches appeared instantaneous across the entire ebook, hence yielding no perceptible impact on speed of search. For interested persons versed in the art, the underlying technique is detailed in the computer program listing appendix; make particular reference to DeviseRangeFilter.cpp and ApplyRangeFilter.cpp.

Step 2270 is frankly debatable. Does it make sense to set proximity control across sets of terms? Within a set, certainly it is meaningful to require that all terms be found within a certain number of words in a Boolean AND operation. But across sets in which there are any number of possible groups, and in the presence of Boolean OR and AND NOT operations, the amount of complexity thrust upon the searcher begins to get out of hand. Should, however, a person versed in the art wish to implement this feature, it requires only a final pass through the result set to eliminate any domains in which the terms are spread beyond the limit imposed by the searcher in step 2270.

Step 2280 gives the user control over the amount of context to display. In cases where domains are larger, it may be desirable to show only the most relevant portion of "hits" with a modest amount of context (but still of course showing any applicable hierarchy of headings). In the prototype embodiment, options were given to the user to "Show all" of the domain, "Show a lot", and "Show a little".

It was argued under the heading "Background of the Invention" that closeness of fit is the best surrogate of meaning for the person who is conducting a search through any quantity of text, whether small or massive. With reference to FIG. 23, step 2310 implements the scoring of each domain within the search results, according to how close together the specified terms are found. The underlying algorithm should take into account the number of waste words that intervene between the first and last term found within a domain or subsection of a domain. In the event that the terms recur within a domain, then the best fit is scored, that is, the sequence that includes all the desired search terms with the fewest waste words. The fewer words required in a sequence to include all the desired terms, the higher the score for closeness of fit. In the prototype embodiment shown in the computer program listing appendix, experiments were carried out using different values of IDEAL_HIT, the score for all terms in order in one level with no waste words. See the #define statement near the beginning of the header file SrFind.h. An IDEAL_HIT value of 100 worked reasonably well; further research showed even better effects when the ideal fit was given a closeness-of-fit score of 1000. The rationale for the 1000 factor will appear below.

Step 2320 is to score for headings. The weight to be given to search terms that appear within headings is a matter of judgment. So too is the inferred proximity of heading words to words within the body of the text. In the preferred implementation, it was assumed that there were no waste words between heading words and any words within the text; it was further decided to give heading words double weight in the frequency scores assigned in step 2330. Note here the importance of the information provided in the headings tree 1860. The text portion of a heading domain is quite limited—perhaps under a dozen bytes of compressed text 0643. Multiple child headings and child paragraphs may occur within the (extended) domain of any heading. In lay terms, the words in the heading of a chapter and a major section of a chapter are certainly related to the meaning of a paragraph within that chapter and section. To account for this meaningfulness, the treatment of domains 0535 is necessarily more complex in the underlying source code than would be the case if headings were ignored. Note for example that if all the words specified occur in the headings, all the subordinate domains may be of interest to the user, and they are added to the list of "hits". The preferred embodiment as shown in the computer program listing appendix accommodates all of these issues. Since the objective is to help the searcher find meaningful results, the extra complexity under the surface is worth while.

Step 2330 is to score for frequencies of terms. Variations of scoring were tried in prototypes. The simplest is to score each occurrence of each term one point. An alternative was to assign the most frequent words a single point, relatively infrequent words two points each, and words that appeared only once or twice in the ebook a score of three each. Word scores might possibly be doubled if a term appears in a heading. Reconsider now the use of score 1000 in step 2310 for ideal closeness of fit. When 100 was used, it was found that the frequency of terms would sometimes dominate, simply by sheer weight of occurrences. The use of a factor of 1000 keeps the closeness of fit as the major factor throughout.

Step 2340 is to sort the results, ranking the domains from that with the highest aggregate score successively to that with the lowest aggregate score, where the aggregates consists of closeness of fit plus frequency of terms in headings plus frequency of terms in the body of text. The resulting list of hits is arranged in order of closeness of fit (domains with zero waste words coming first, those with one waste word coming second, etc.) with frequency of occurrence in headings and body controlling the ranking when the number of waste words is the same for multiple domains. The scoring may be reported in any of a number of ways. It may, for example, be broken out as two scores, one for declining closeness of fit (or increasing count of waste words), another for cumulative word frequency scores. Another possibility is to normalize single scores around some base such as 100 for zero waste words combined with highest frequency of occurrences. Whatever the score reporting system, it should be kept simple. The easiest for the user to understand is the clear divergence of desired terms going down the list, with perhaps a one-point-per-occurrence score uniformly for frequency.

FIG. 24 treats the method of displaying the results of a search. At this point, there is already knowledge of what domains are to be displayed, what are the significant terms in those domains to be highlighted, what is the order in which the domains are to be displayed, what scores brought about that order, and what is the total count of hits found. There can be wide discretion in how this display is implemented. The method may be influenced by what is becoming an industry standard . . . to show a count of total hits, a summary list of the first ten hits, and links that lead to detail of each of the first ten hits, or alternatively to later sets of ten hits at a time. FIG. 24 merely presents some options.

Step 2410 is to display a summary list of hits. This is the method used in the preferred embodiment; see detail logic in ShowSummary.cpp in the computer program listing appendix. Each item in the summary is accompanied by a score, and is in part a clickable link which takes the user directly to a more detailed display. The summary might consist of paragraph headings alone, provided they are unique and informative. Alternatively, the display might start with a chain made up of successive levels of headings.

Step 2420 lists four options . . . to display headings only, summaries with highlighted terms, full context with highlighted terms, or the original document. All display options use the technique described in step 1960 to extract the full text from the compressed text RAM file 0643.

Step 2430 is appropriate only when the compression index ebook 0240 is intended as an e-index 1920 1990 only. In this case, the user is shown locations only within a published work, but none of the actual text. None of the summary items are links in this case. The user needs the paper text handy to get any value from an e-index.

Step 2440 is to show summaries with highlighted terms, with clickable links to navigate to more detail. This is closest to what is becoming a quasi-standard. Relatively little context is included. Ellipses are indicated in the summary by three dots.

Step 2450 usually follows as a result of the user clicking on a link in step 2440. Then the user is shown full context with highlighted terms. Highlighting in the preferred embodiment is driven by color codes 8 to 15 inserted in nybbles corresponding to bytes in the compressed text. This enables eight distinct colors; for complex searches, the colors are recycled for additional terms. See SetNybbleColor.cpp and GetNybbleColor.cpp in the computer program listing appendix.

Step 2460 is the alternative to show the original document. For Internet based search, this requires simply storing the URL (Uniform Resource Locator) for each page within the applicable domain within the compression index ebook 0240. It is easily made clickable and displayed as part of either step 2410 or step 2440 above.

Step 2470 enables the user to navigate to nearby context. This requires the insertion of links to adjacent domain numbers within the body of each domain.

Step 2480 enables the user to navigate to any links whatsoever that are embodied within the source text for the compression index ebook 0240. Since the display environment is either a dynamic HTML page on the Internet or a browser page emulation on a client computer, all that is needed is connection to the Internet.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

Having thus described the invention, it is now claimed:

1. A computer implemented method of compression indexing, comprising the steps of:

selecting at least one data file, said data file having target text; identifying each and every unique token, each of the unique tokens having a frequency; counting the frequency of each unique token; calculating parameters; ranking the tokens from highest frequency to lowest frequency; compressing the frequencies; assigning a position to each instance of each and every unique token; compressing the positions; aggregating tokens, frequencies, parameters, and positions to form a compression index, said compression index being exhaustive of all said tokens, such that said target text is compressed 100%;

reconstituting a portion of the data file; displaying the portion of the data file on a screen, wherein compressed positions point to a compressed text random access memory file, wherein the step of reconstituting the data file further comprising the steps of: a) creating the compressed text RAM file; b) selecting a domain to display, the domain being a portion of the data file, the domain having a starting point and an ending point; c) decompressing successive integers; d) determining positions of the tokens in the token list; e) extracting the tokens from the token list; and f) writing the tokens to the screen; repeating steps c-f until the ending point of the domain is reached; wherein the selected domain is part of a domains list, the domains list having a plurality of domains, the domains list having the starting point and the ending point of each domain.

2. The method of claim 1, wherein the tokens include every word, every number, every string of punctuation characters, and every markup tag without exception.

3. The method of claim 1, wherein the token is a string of punctuation characters.

4. The method of claim 1, wherein the token is a markup tag with no blanks.

5. The method of claim 1, further comprising the step of: searching the compression index.

6. The method of claim 5, wherein searching occurs in random access memory.

7. The method of claim 6, wherein the step of searching the compression index is performed without disk seeks.

8. The method of claim 1, wherein the step of compressing the positions to form a compression index, the position of the first instance of each token is absolute, and the position of each subsequent instance of the same token is relative to the preceding position.

9. The method of claim 1, wherein the compression index is structured to derive closeness-of-fit measures, the compression index also structured to reproduce any portion of original text for display.

10. The method of claim 5, further comprising the step of: ranking search results by relevance, wherein relevance is determined by the closeness of fit of search terms, headings, and frequencies of search terms.

11. The method of claim 1, further comprising the step of: browsing the compression index, wherein an associated user is able to sequentially read content created from the compression index starting at any point.

12. A computer implemented method for using a compression index, comprising the steps of: a) creating the compression index having the steps of: (i) providing target text, the target text being at least one data file, the target text having tokens, the tokens having frequencies; (ii) accumulating parameters; (iii) building a list of all unique tokens represented in the target text, together with their respective frequencies; (iv) sorting the list in order of declining token frequencies; (v) accumulating positions data of each instance of each token; and (vi) combining steps i-v into the compression index, the compression index being exhaustive of all tokens, such that the target text is 100% compressed; b) browsing and searching the compression index, wherein the step of accumulating parameters comprises: accumulating parameters and token frequencies on a single pass through the at least one data file, the data file having lightly marked up text, wherein the single pass through of the at least one data file of lightly marked up text comprises input for the compression index, wherein the step of building a list of all tokens represented in the target text, together with their respective frequencies further comprises the steps of: sorting all tokens in order of declining frequency; creating a temporary parameters file to facilitate passing parameters between successive states of the method to create the compression index; parsing the target text as a means for creating the token list, each of the tokens having a flag byte preceding the token and a null byte following the token; and compressing and outputting the frequencies of tokens; wherein the step of accumulating positions data further comprises the steps of: reserving a block of random access memory to accumulate positions data; reparsing the entire data file; recording the position of all tokens in the random access memory block; and compressing and outputting the positions data, wherein the position of the first instance of each token is absolute, and the position of each subsequent instance of the same token is relative to the preceding position; wherein the step of combining steps (i)-(v) into one compression index, further comprises the steps of: outputting public parameters as plain text at a beginning of the compression index; outputting compressed private parameters; and appending the tokens, frequencies and positions to complete the compression index; wherein numeric values assigned to successive tokens from the data file are compressed and successively appended to create a compressed text random access memory file, wherein the random access memory file is computationally equivalent to the target text such that the positions within this compressed text random access memory file are used as the position values of successive tokens.

13. The method of claim 12, wherein browsing and searching occurs on a personal computer.

14. The method of claim 12 wherein, browsing and searching is server based over an Internet.

15. The method of claim 12, wherein positions are compressed, compressed positions of the data file point to a compressed text random access memory file, the method further comprising the step of reconstituting the data file to browse and search the compression index comprising the steps of: creating the compressed text RAM file; selecting a domain to display, the domain being a portion of the data file, the domain having a starting point and an ending point, wherein the selected domain is part of a domains list, the domains list having a plurality of domains, the domains list having the starting point and the ending point of each domain; decompressing successive integers; determining positions of the tokens in the token list; extracting the tokens from the token list; writing the tokens to the screen; and repeating steps c-f until the ending point of the domain is reached.

16. The method of claim 12, wherein after searching the compression index, search results are ranked by relevance.

17. The method of claim 16, wherein searching the compression index comprises the step of: scoring for closeness of fit of search terms by measuring the number of non-requested words that intervene between the first and last term found within a domain, and subtracting the count of non-requested words from the maximum allowable value.

18. The method of claim 17, wherein searching the compression index comprises the step of: scoring for headings.

19. The method of claim 18, wherein searching the compression index comprises the step of: scoring for frequencies of search terms.

20. The method of claim 18, further comprising the step of: ranking search results from the domain with the highest score to lowest score, wherein scores equal the sum of closeness of fit, frequency of search terms in heading and frequency of terms in the domain, wherein search results are displayed as a list of hits arranged in order of closeness of fit and with frequency of occurrence in headings and body controlling the ranking when the number of intervening non-requested words is the same for multiple domains.

21. A computer readable medium containing instructions for controlling a computer system to perform a method, the method comprising the steps of:

selecting at least one file having target text; identifying each and every unique token, each of the unique tokens having a frequency, the tokens including every word, every number, every string of punctuation characters, and every markup tag without exception; counting the frequency of each unique token; calculating parameters; ranking the tokens from highest frequency to lowest frequency; compressing the frequencies; assigning a position to each instance of each token; compressing the positions; aggregating tokens, frequencies, parameters, and positions to form a compression index, such that the target text is compressed 100%; and browsing and searching the compression index;

reconstituting a portion of the at least one file; displaying the portion of the at least one file on a screen; wherein compressed positions point to a compressed text random access memory file, the step of reconstituting the at least one file further comprising the steps of: a) creating the compressed text RAM file; b) selecting a domain to display, the domain being a portion of the at least one file, the domain having a starting point and an ending point; c) decompressing successive integers; d) determining positions of the tokens in the token list; e) extracting the tokens from the token list; and f) writing the tokens to the screen; repeating steps c-f until the ending point of the domain is reached; wherein the selected domain is part of a domains list, the domains list having a plurality of domains, the domains list having the starting point and the ending point of each domain.

22. An apparatus, comprising: means for selecting at least one file, the at least one file having target text; means for identifying each and every unique token, each of the unique tokens having a frequency, the tokens including every word, every number, every string of punctuation characters, and every markup tag without exception;

means for counting the frequency of each unique token; means for calculating parameters; means for ranking the tokens from highest frequency to lowest frequency; means for compressing the frequencies; means for assigning a position to each instance of each token;

means for compressing the positions; and means for aggregating tokens, frequencies, parameters, and positions to form a compression index, such that the target text is compressed 100%; and means for browsing and searching text derived from the compression index; wherein the compression index is formed by accumulating parameters and token frequencies on a single pass through the at least one data file, the at least one data file having lightly marked up text, wherein the single pass through of the at least one data file of lightly marked up text comprises input for the compression index;

wherein the tokens are all sorted in order of declining frequency; wherein the compression index further comprises a temporary parameters file to facilitate passing parameters between successive states of the method to create the compression index;

wherein the target text is parsed as a means for creating the token list, each of the tokens having a flag byte preceding the token and a null byte following the token; and wherein the frequencies of tokens are compressed and outputted; wherein a block of random access memory is reserved to accumulate positions data; wherein the entire data file is reparsed; wherein the position of all tokens are recorded in the random access memory block; and wherein the compressed and outputted positions data includes the position of the first instance of each token being absolute, and the position of each subsequent instance of the same token being relative to the preceding position; wherein public parameters are outputted as plain text at a beginning of the compression index; compressed private parameters are outputted; and the tokens, frequencies and positions are appended to complete the compression index; wherein numeric values assigned to successive tokens from the data file are compressed and successively appended to create a compressed text random access memory file, wherein the random access memory file is computationally equivalent to the target text such that the positions within this compressed text random access memory file are used as the position values of successive tokens.

* * * * *